(12) United States Patent
Payne et al.

(10) Patent No.: US 8,726,169 B2
(45) Date of Patent: May 13, 2014

(54) ONLINE SYSTEM AND METHOD FOR ENABLING SOCIAL SEARCH AND STRUCTURED COMMUNICATIONS AMONG SOCIAL NETWORKS

(75) Inventors: John M. Payne, Laguna Beach, CA (US); Douglas W. Tung, Santa Monica, CA (US)

(73) Assignee: CircleUP, Inc., Newport Beach, CA (US)

( * ) Notice: Subject to any disclaimer, the term of this patent is extended or adjusted under 35 U.S.C. 154(b) by 1319 days.

(21) Appl. No.: 11/899,446

(22) Filed: Sep. 5, 2007

(65) Prior Publication Data

US 2008/0307320 A1    Dec. 11, 2008

Related U.S. Application Data

(60) Provisional application No. 60/842,468, filed on Sep. 5, 2006.

(51) Int. Cl.
*G06F 3/00*  (2006.01)
*G06F 3/048*  (2013.01)

(52) U.S. Cl.
USPC ........... 715/751; 715/705; 715/714; 715/733; 715/752; 715/764

(58) Field of Classification Search
USPC ......... 715/700, 705, 714, 733, 751–759, 764, 715/809
See application file for complete search history.

(56) References Cited

U.S. PATENT DOCUMENTS

| | | | | |
|---|---|---|---|---|
| 4,451,700 A | * | 5/1984 | Kempner et al. | ........ 379/88.01 |
| 5,893,098 A | * | 4/1999 | Peters et al. | ...................... 1/1 |
| 5,899,972 A | * | 5/1999 | Miyazawa et al. | ........... 704/249 |
| 5,951,638 A | * | 9/1999 | Hoss et al. | ................ 709/206 |
| 6,070,145 A | * | 5/2000 | Pinsley et al. | ............... 705/7.32 |
| 6,453,337 B2 | | 9/2002 | Miller et al. | |
| 6,457,045 B1 | | 9/2002 | Hanson et al. | |
| 6,463,461 B1 | | 10/2002 | Hanson et al. | |
| 6,477,504 B1 | * | 11/2002 | Hamlin et al. | .............. 705/7.32 |
| 6,496,849 B1 | | 12/2002 | Hanson et al. | |
| 6,505,233 B1 | | 1/2003 | Hanson et al. | |
| 6,507,865 B1 | | 1/2003 | Hanson et al. | |

(Continued)

OTHER PUBLICATIONS

Heer, et al. "Prefuse: A Toolkit for Interactive Information Visualization". CHI (Apr. 2-7, 2005) (11 pages).

*Primary Examiner* — Matt Kim
*Assistant Examiner* — Yongjia Pan
(74) *Attorney, Agent, or Firm* — Christie, Parker & Hale, LLP

(57) ABSTRACT

A system and method for enabling structured communication among a social network is disclosed. The system enables a user to formulate a question and answer pattern including potential responses to the question based upon the form of question. The system then translates and transmits a message including the question and answer pattern to users over a plurality of different messaging platforms for eliciting responses to the question using the answer pattern. The system then aggregates responses to the question and presents the responses in a summary format. A language for defining messages according to static and dynamic content and other attributes is disclosed. Collaborative filtering reduces the decision space and as a result increases the possible range of specialized communications a user can choose from and apply or the message processing space available to contemplate alternatives resulting in more effective choices.

40 Claims, 34 Drawing Sheets

(33 of 34 Drawing Sheet(s) Filed in Color)

(56) References Cited

U.S. PATENT DOCUMENTS

| | | |
|---|---|---|
| 6,523,063 B1 | 2/2003 | Miller et al. |
| 6,539,392 B1 * | 3/2003 | Rebane .................. 705/7.31 |
| 6,665,666 B1 * | 12/2003 | Brown et al. ................. 1/1 |
| 6,691,153 B1 | 2/2004 | Hanson et al. |
| 6,871,216 B2 | 3/2005 | Miller et al. |
| 6,912,521 B2 * | 6/2005 | Kraft et al. ................. 1/1 |
| 6,999,987 B1 * | 2/2006 | Billingsley et al. .......... 709/203 |
| 7,130,885 B2 | 10/2006 | Chandra et al. |
| 7,222,156 B2 * | 5/2007 | Gupta et al. ............... 709/206 |
| 7,233,908 B1 * | 6/2007 | Nelson ..................... 705/7.32 |
| 7,359,943 B2 | 4/2008 | Szeto et al. |
| 7,386,589 B1 | 6/2008 | Tanumihardja et al. |
| 7,403,599 B2 * | 7/2008 | Amin ...................... 379/88.14 |
| 7,899,700 B2 * | 3/2011 | Floyd et al. ............... 705/7.32 |
| 8,170,189 B2 * | 5/2012 | Alperin et al. ............ 379/142.14 |
| 2001/0031454 A1 * | 10/2001 | Mintz ....................... 434/322 |
| 2002/0038302 A1 * | 3/2002 | Maeda ...................... 707/100 |
| 2002/0128898 A1 * | 9/2002 | Smith et al. ................. 705/10 |
| 2003/0144899 A1 * | 7/2003 | Kokubo ...................... 705/10 |
| 2003/0163514 A1 * | 8/2003 | Waldschmidt ............... 709/201 |
| 2003/0200137 A1 * | 10/2003 | Drummond ................... 705/12 |
| 2004/0249890 A1 * | 12/2004 | Fellenstein et al. .......... 709/206 |
| 2005/0160367 A1 * | 7/2005 | Sirota et al. ................ 715/753 |
| 2005/0198031 A1 * | 9/2005 | Pezaris et al. ............... 707/9 |
| 2005/0273804 A1 * | 12/2005 | Preisman ..................... 725/24 |
| 2006/0042483 A1 * | 3/2006 | Work et al. .................. 101/91 |
| 2006/0155513 A1 * | 7/2006 | Mizrahi et al. ............... 702/179 |
| 2006/0173963 A1 * | 8/2006 | Roseway et al. ............. 709/206 |
| 2006/0259469 A1 * | 11/2006 | Chiu .......................... 707/3 |
| 2007/0067293 A1 * | 3/2007 | Yu ............................ 707/7 |
| 2007/0121856 A1 * | 5/2007 | Alperin et al. ............ 379/142.12 |

* cited by examiner

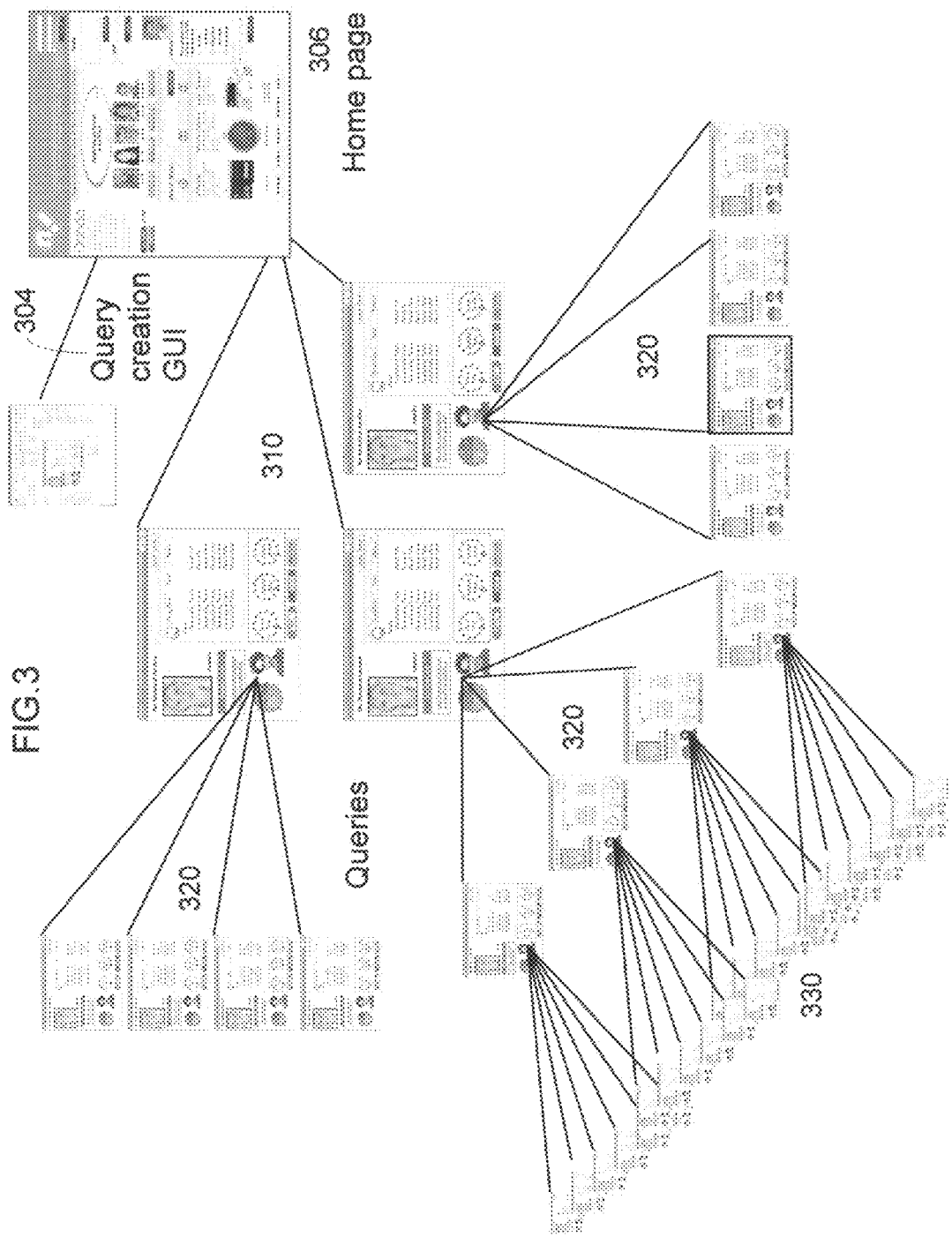

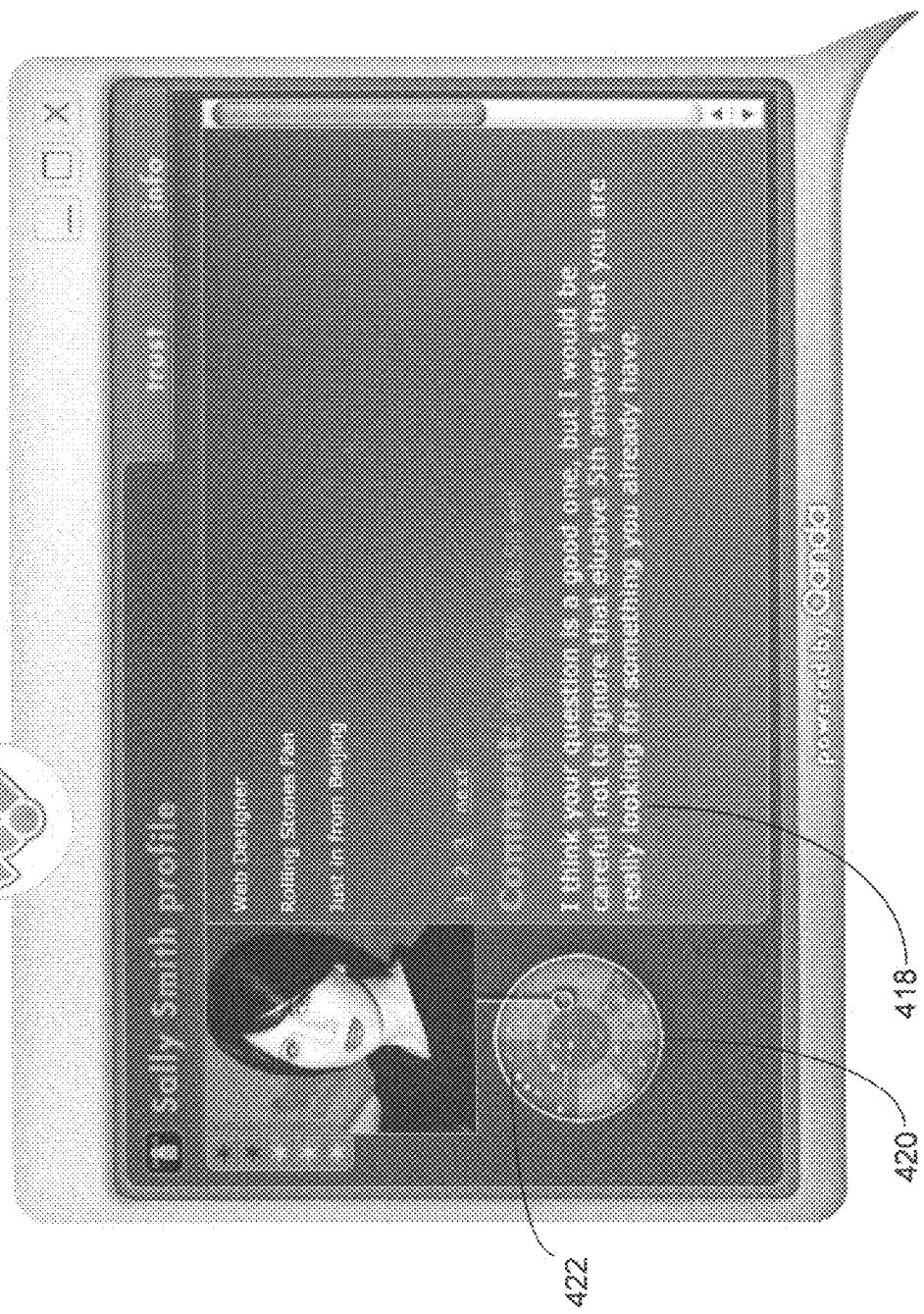

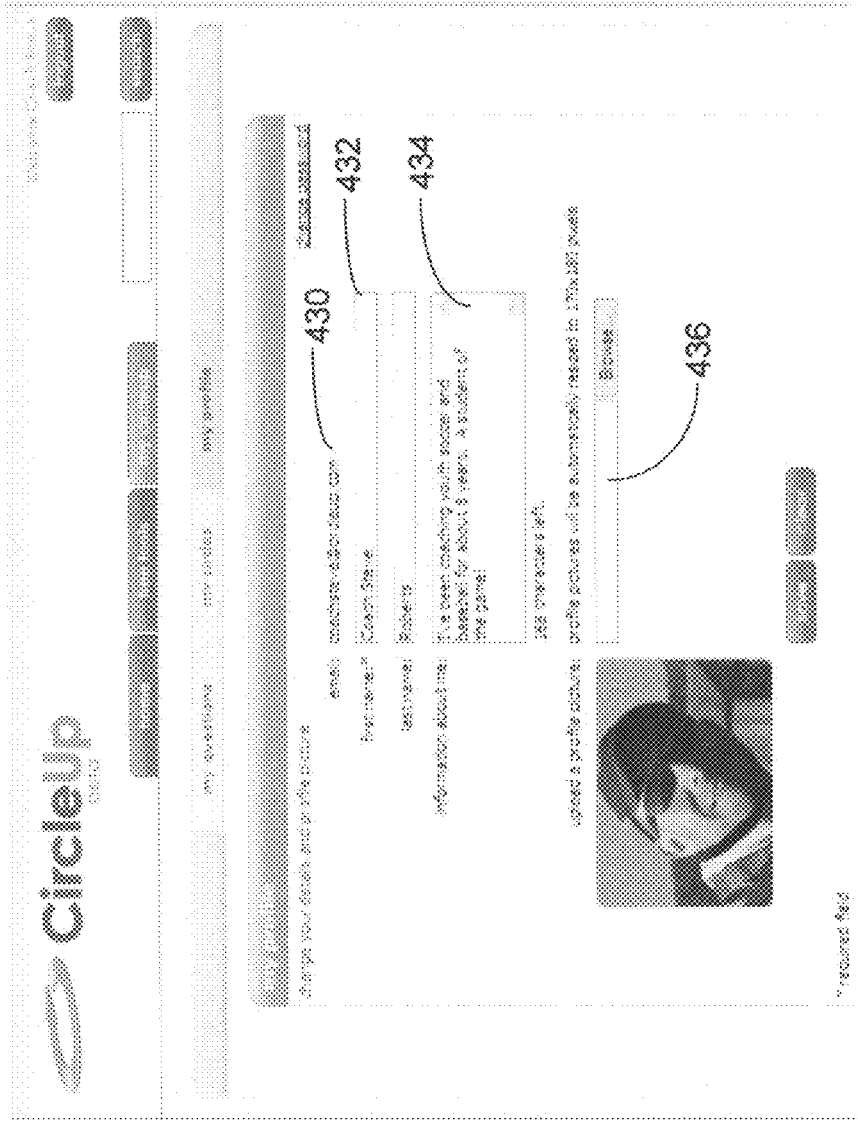

Sample Replacement ref. Desig.

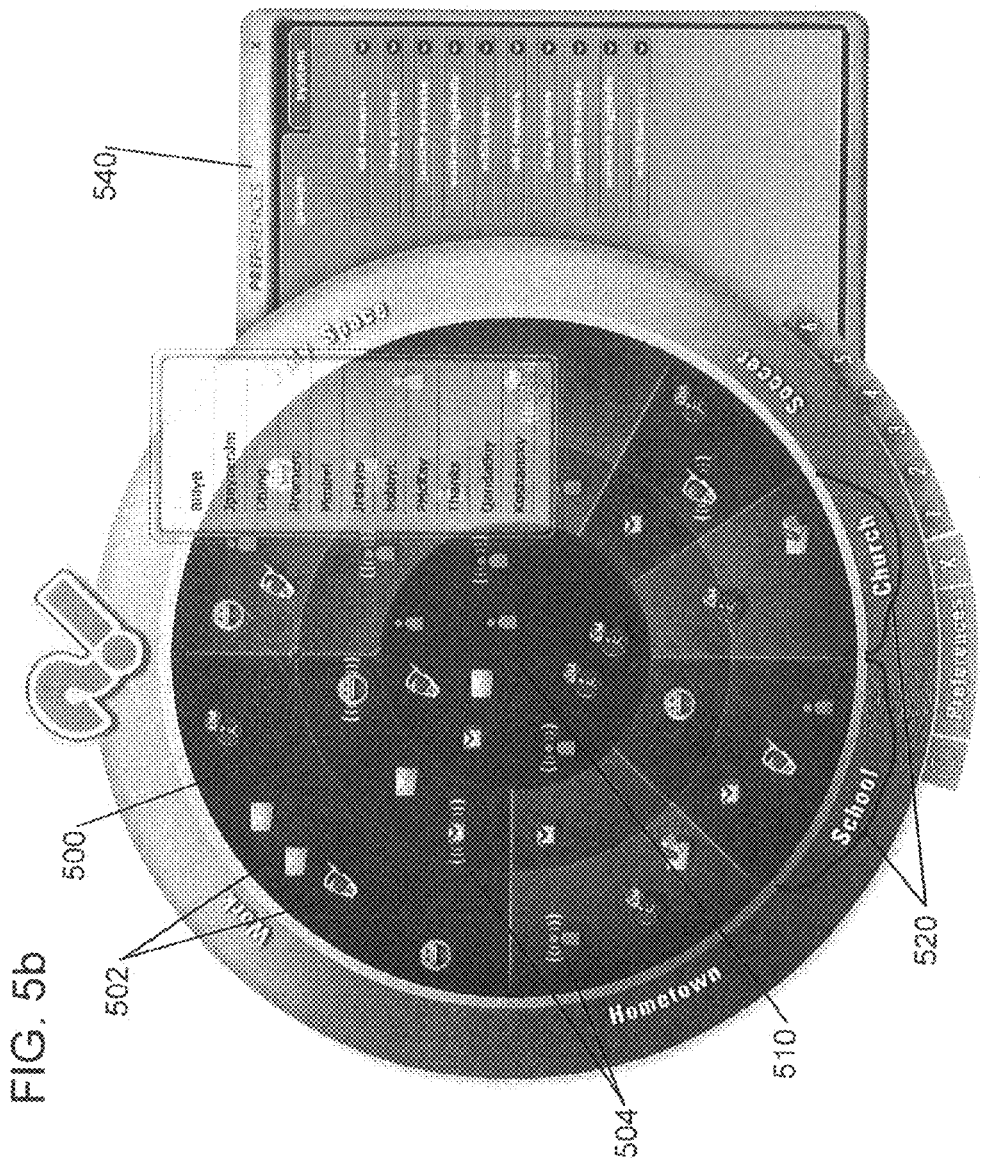

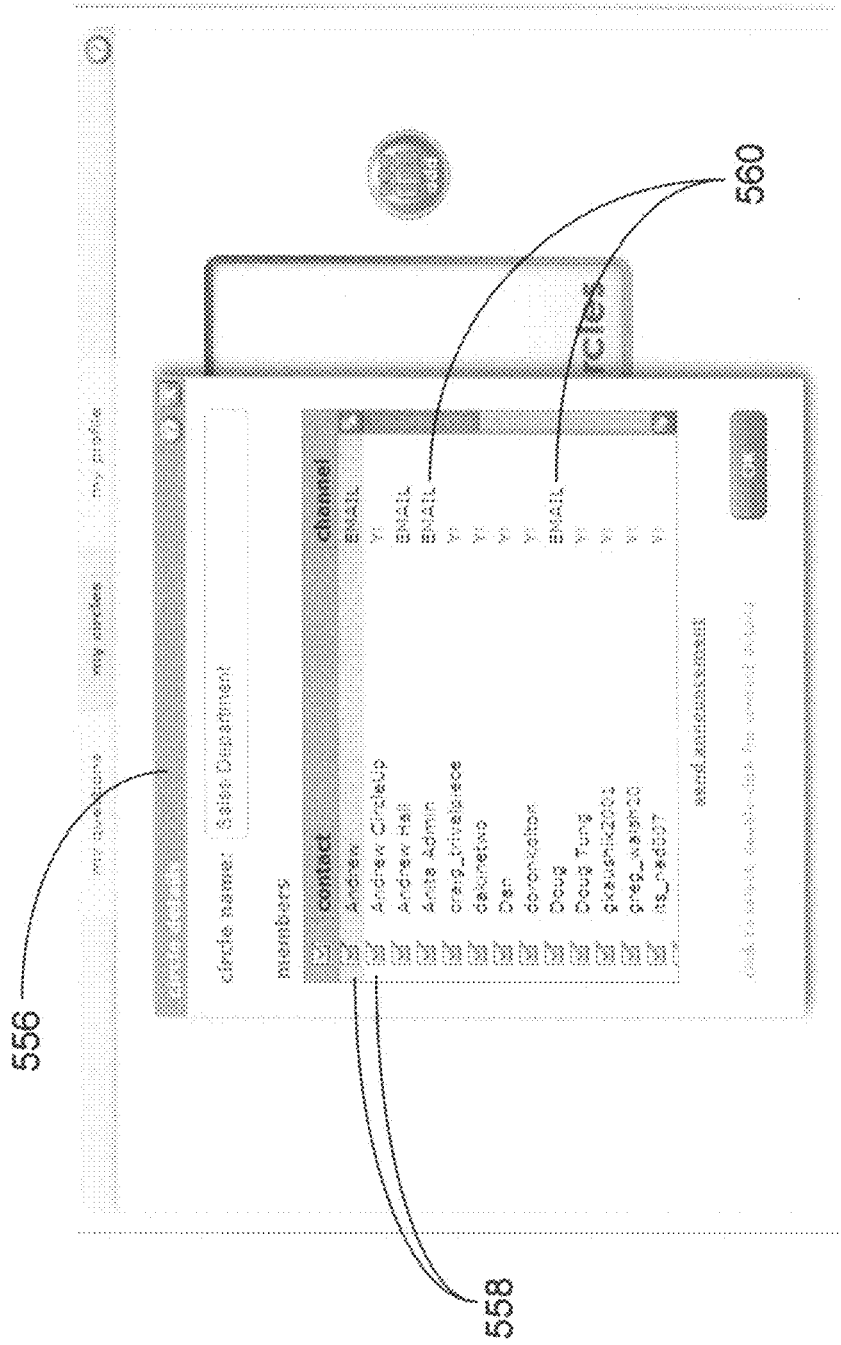

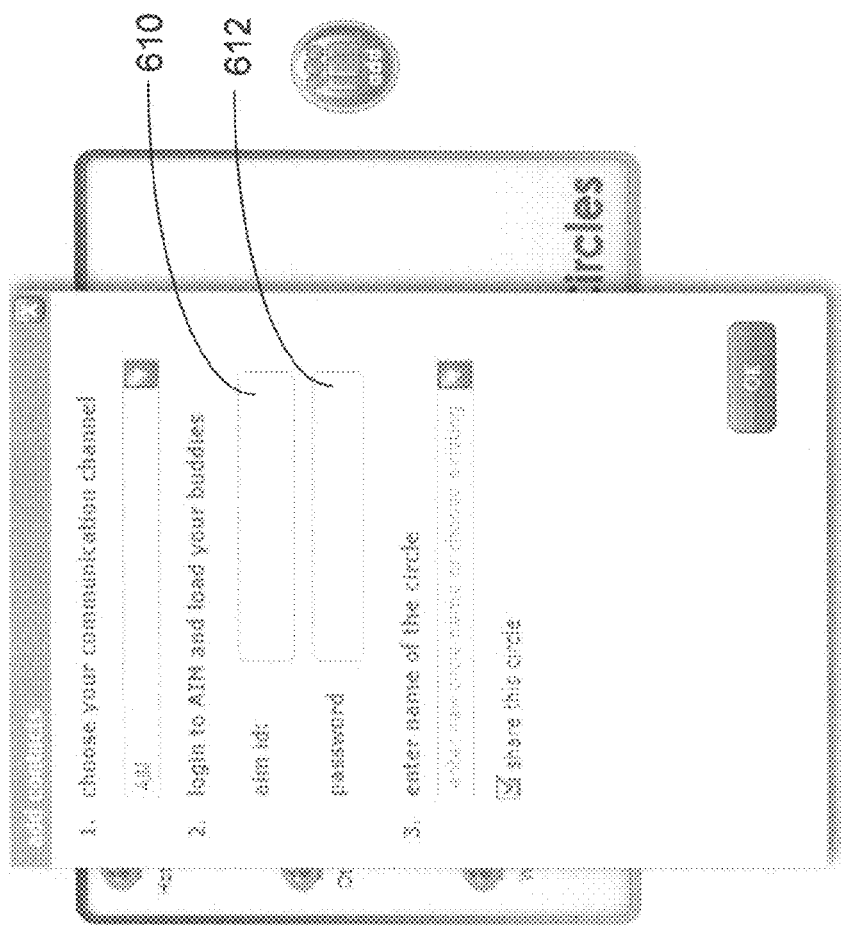

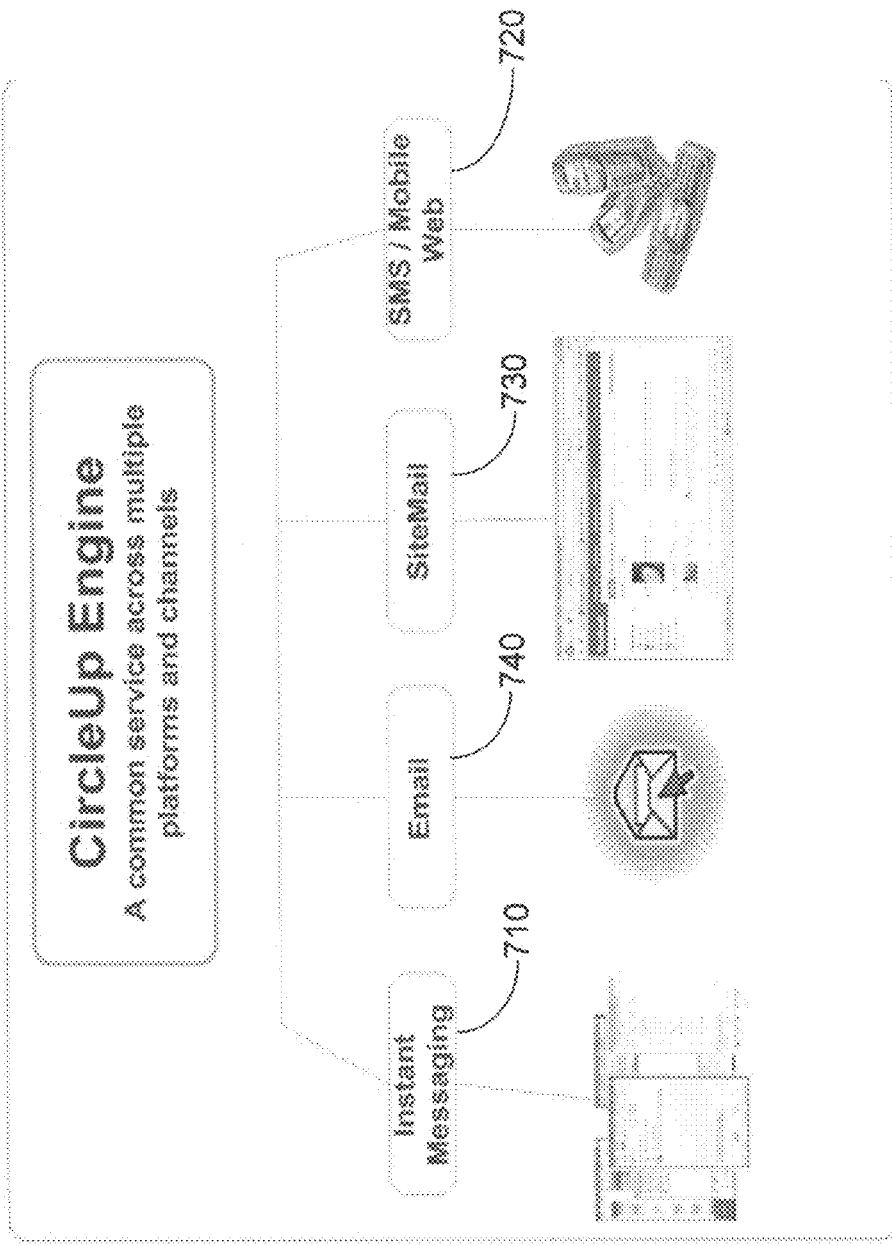

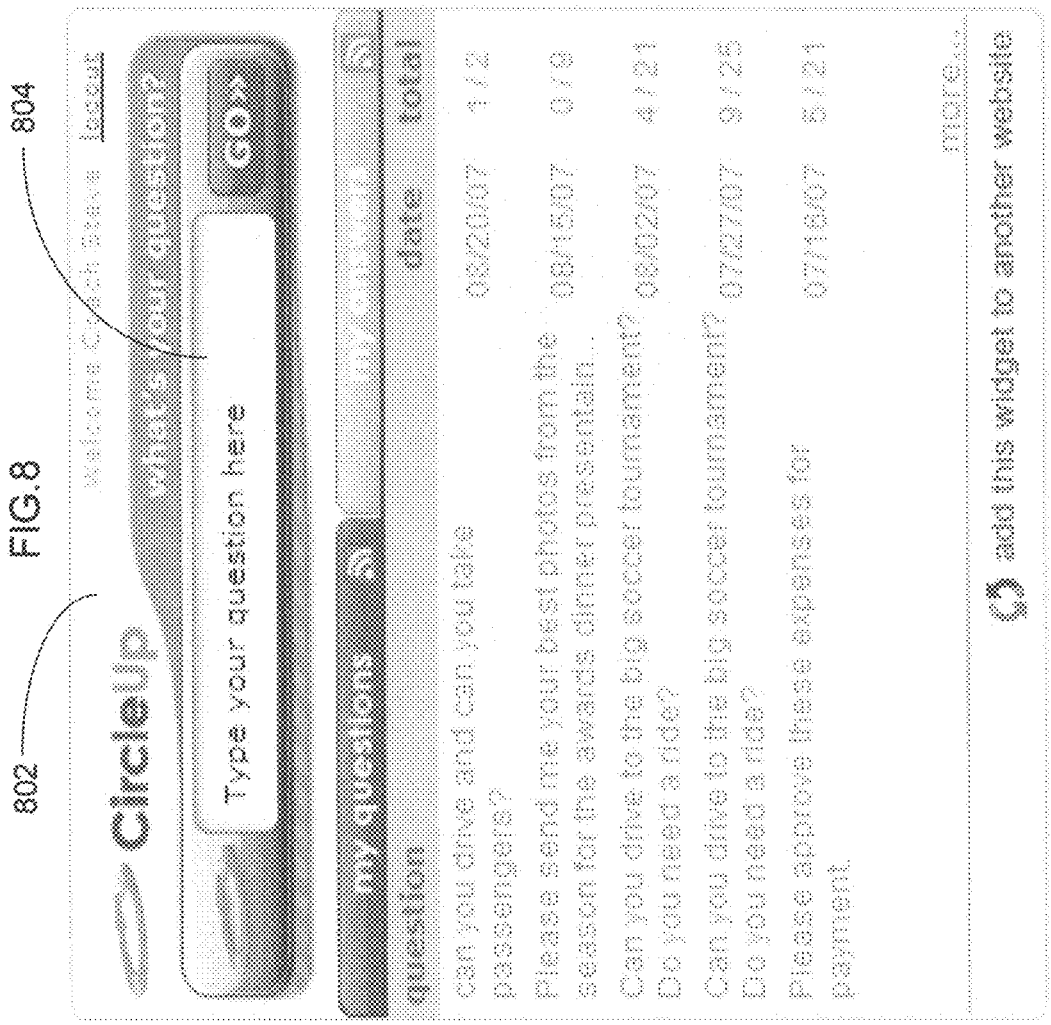

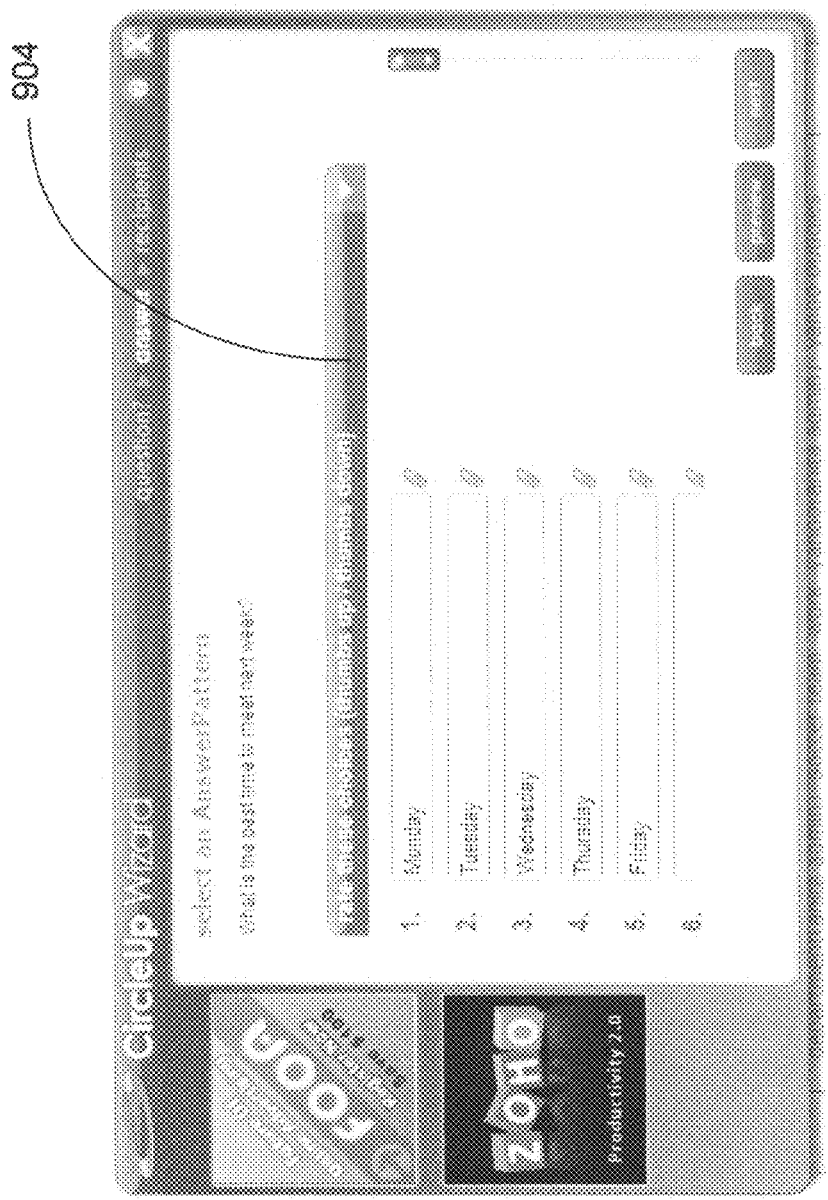

FIG. 13b
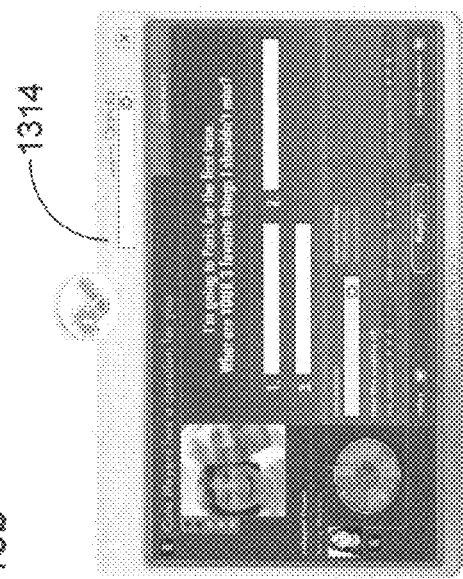
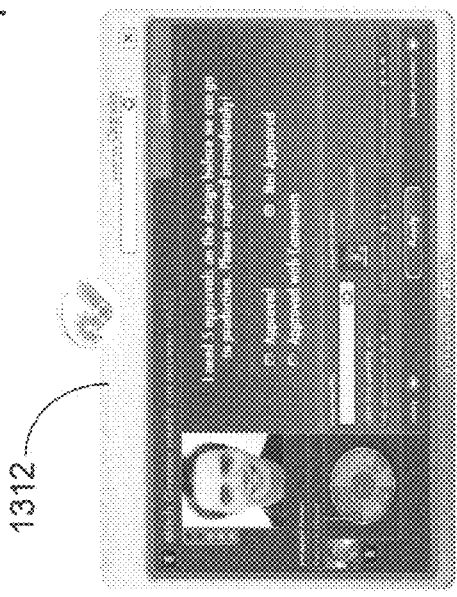

FIG.20
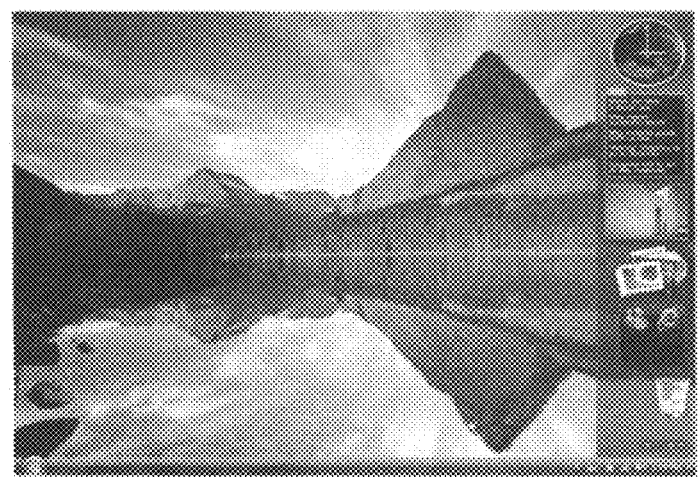
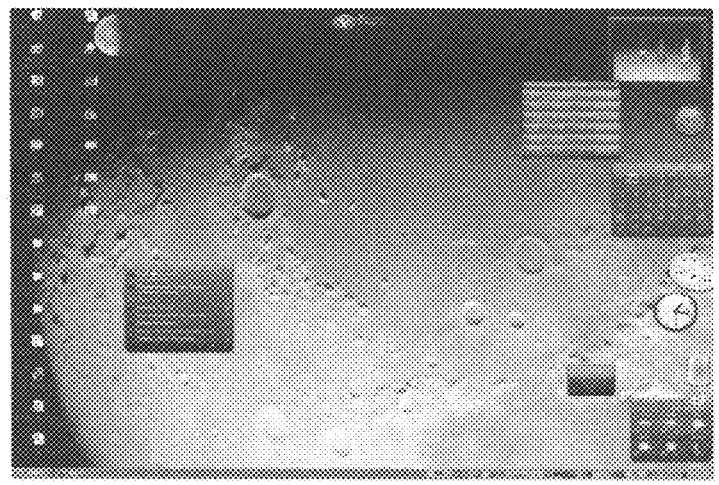

ONLINE SYSTEM AND METHOD FOR ENABLING SOCIAL SEARCH AND STRUCTURED COMMUNICATIONS AMONG SOCIAL NETWORKS

CROSS-REFERENCE TO RELATED APPLICATION

The present application claims the benefit of U.S. provisional patent application 60/842,468, filed Sep. 5, 2006, the contents of which are hereby incorporated by reference.

FIELD OF THE INVENTION

In one exemplary embodiment, the invention is directed to improving the effectiveness of messaging and communication.

BACKGROUND

Fundamentally, people have an innate desire to survive and prosper. Because an individual does not have the relative capacity to survive and prosper independently, it is highly desirable that people be able to communicate effectively with each other. This is done by exchanging messages in the form of signals (e.g., voice, written text, etc.) These messages typically consist of the message content, its context, the time to deliver and the cost to send the message. The effectiveness of the message to a specific audience is a function of these factors. The value of the message itself to the sender is its relative utility (the contribution the sending of the message makes to their perception of well being). This value is based largely on actions taken (or not taken) by the recipient of the message. Enormous effort has been directed to maximizing the value of this function, which we refer to as the messaging value function.

Individual success is often based on the ability for the individual to transact in its social network (the marketplace) in order to trade cooperation, information, favors, goods and services to survive and prosper economically. This ability is highly dependent on this messaging value function.

As technology has evolved, the range of parameters (the space of possibilities) for this function has changed greatly. For example, with written communication such as e-mail and instant messaging, time and cost to send a message have decreased towards zero. On the other hand, the relative return of value of the message itself has changed by a much lesser degree. However, context, i.e., the environment in which the message is received, has increased in entropy. The number and variety of messages have altered the perception of the recipient and the cost of processing of each message. In many cases listeners are more distrustful, busy and jaded which reduces the relative value of the message content, time and cost being equal.

Spoken language, writing, mail, printing, telegraph, telephone, television, electronic mail and the Internet have derived their immense value and impact to their ability to affect this messaging value function. What each of these did was primarily reduce the time and cost of the distribution of the message. With the exception of language each has had a far less significant impact on the message content and its context.

Furthermore, in many cases, individual messages have been considered in isolation. Messages in typical cases occur in a network and the have a cumulative and interactive effect. Reductions in messaging cost and time have resulted in an increase in messages. The increase of messages has resulted in competition amongst messages for time and action on behalf of the recipient. As the number of messages has increased, the time potentially available for a recipient to react to each one decreased. Many messages are disseminated to a group of recipients at a time. This one to many communication multiplies the effect of the average message processing time.

The net effect is that while cost and time of distribution has gone toward zero, the relative value of the content of the message has gone down. In addition, the influence of the environment of the message has largely been negative as it relates to the volume of messages, excluding consideration in the trust and receptiveness aspect of the environment which has increased globally.

The area of marginal value for improvements in the messaging value function is primarily in the message and the environment, not in the cost or time of distribution. This is due to the much larger inefficiencies and range in the message itself and the environment, compared to cost and time improvements.

In addition, the network effect also may alter the message processing time. A recipient has a finite amount of time available to read and process messages. The more messages recipients receive, on average, the lesser amount of time they have to give attention to individual messages. Recipients then typically develop screening strategies to focus their energy on the more important messages. If one can reduce the overall number of messages a recipient receives, the messaging value function may increase. If messages stand out from others to be screened by the recipient as more important, the value of the messaging value function may increase.

By way of example, many decisions in an individual's daily life are ones for which advice, opinions, or direction from others is useful or necessary. When choosing what college is best for a child, a person may benefit from the advice of parents whose children are in college. When moving a design into production, an engineer may need the approval of several managers. A disk jockey preparing for a wedding may seek input from wedding participants and guests on what songs should be played at the wedding. In these situations, seeking advice or approval from others individually can be time-consuming, inefficient, and often inexact.

Using e-mail or instant messaging, a person may send out a question to a large number of potential responders at once. By writing about a question on a blog, or posting a question to a web service such as Yahoo® Answers, a person may enable the public to respond in comments posted to the blog or to the web service. Yahoo® is a registered trademark of Yahoo! Inc., Sunnyvale, Calif. Search engines allow a user to search for opinions relevant to his or her decision. All of these approaches have flaws, however. All require manual aggregation of the responses. In the case of blog comments, web services such as Yahoo® Answers, or search engine results, the trustworthiness of the information returned may be difficult to assess, in part because the respondents self-select, and because they may not self-select on the basis of expertise. Only e-mail and instant messaging allow the user to target a particular set of recipients with his or her question. As mentioned, however, both e-mail and instant messaging currently represent an overwhelming torrent of user-generated content and communications that is unstructured and qualitative. A focus on trust and collaboration is desirable in social networks as lives move online.

Another drawback of current systems is that they may require users who wish to collaborate in many cases to register, download, or share in advance a software module. This condition precedent may be inefficient in that it adds a step to the collaboration process, and may discourage some from interacting.

Further, in order to ask follow-up questions, a user must often generate new questions without the benefit of the context of the prior questions.

Based on the foregoing, it would be highly desirable to improve the relative value of the message content and its environment. By way of one example only, it would be advantageous to be a system that builds upon prior questions and suggests follow-up questions based on prior questions in a thread, and allows a user to share questions and receive answers in an efficient, prescribed format within a trusted circle or group of recipients.

SUMMARY

According to one exemplary embodiment, one benefit of the present invention is that it provides a person the ability to frame a question in a manner that will lead to meaningful answers instead of searching through documents for information that the documents may or may not contain. The exemplary system according to one embodiment allows a person to create a message, also referred to as a query, that may include a question and may include answer options and other attributes, and send the query to a set of correspondents. The correspondents, also referred to as recipients, are then given an opportunity to answer the question, add comments, and provide various other types of feedback. The recipients may also have the option of forwarding the query to additional recipients. In this manner, the question is directed to a user community, based on a network of contacts and resources, as a type of broader communications task.

The system then may automatically route, collect, and aggregate the responses in order to produce a collaborative recommendation for the author of the query. Other users may also be able to view the aggregated query responses. Query responses may be syndicated, and, for example, may be viewable by subscribing to a Really Simple Syndication (RSS) feed. The system may provide visualizations of query responses that show the status and evolving state and maturity of the query.

In another aspect, the system provides loosely structured questions in order to enable easy access for users. User-generated information is organized into a slightly-structured, somewhat quantified form.

In another aspect, the system includes a Question Markup Language (QML), a language for representing questions. For example, using an embodiment of the online system in accordance with the system allows a user to represent questions as a form of communications including content workflow as an extensible markup language and ontology that supports rendering, response collection, aggregation and life cycle, thereby allowing incremental and evolutionary refinement.

BRIEF DESCRIPTION OF THE DRAWINGS

The patent of application file contains at least one drawing executed in color. Copies of the patent or patent application publication with color drawings will be provided by the Office upon request and payment of the necessary fee.

These and other aspects of the invention will be more readily comprehended in view of the discussion herein and accompanying drawings.

FIG. 3 is a schematic diagram of the creation and propagation of a query;

FIG. 4b is a screen shot of an exemplary profile with comments;

FIG. 4c is an alternate embodiment of a user profile GUI;

FIG. 5b is a screen shot of an exemplary correspondent management GUI showing a translucent mouseover which displays a list of correspondent names;

FIG. 5e is a GUI showing details of a circle or group;

FIG. 6 is a screen shot of an exemplary GUI used to prompt a query author for instant messaging screen names and passwords;

FIG. 7 is a schematic diagram illustrating several exemplary messaging networks;

FIG. 8 is a screen shot of an exemplary system toolbar GUI for creating a query;

FIG. 9a is a screen shot of an exemplary query creation GUI in which answer options are specified;

FIG. 13b shows screen shots of three other exemplary query GUIs;

FIG. 20 is a screen shot of an exemplary integration of GUIs into Microsoft® Live and Yahoo®;

DETAILED DESCRIPTION OF AN EXEMPLARY EMBODIMENT

I Introduction

Figure 1:
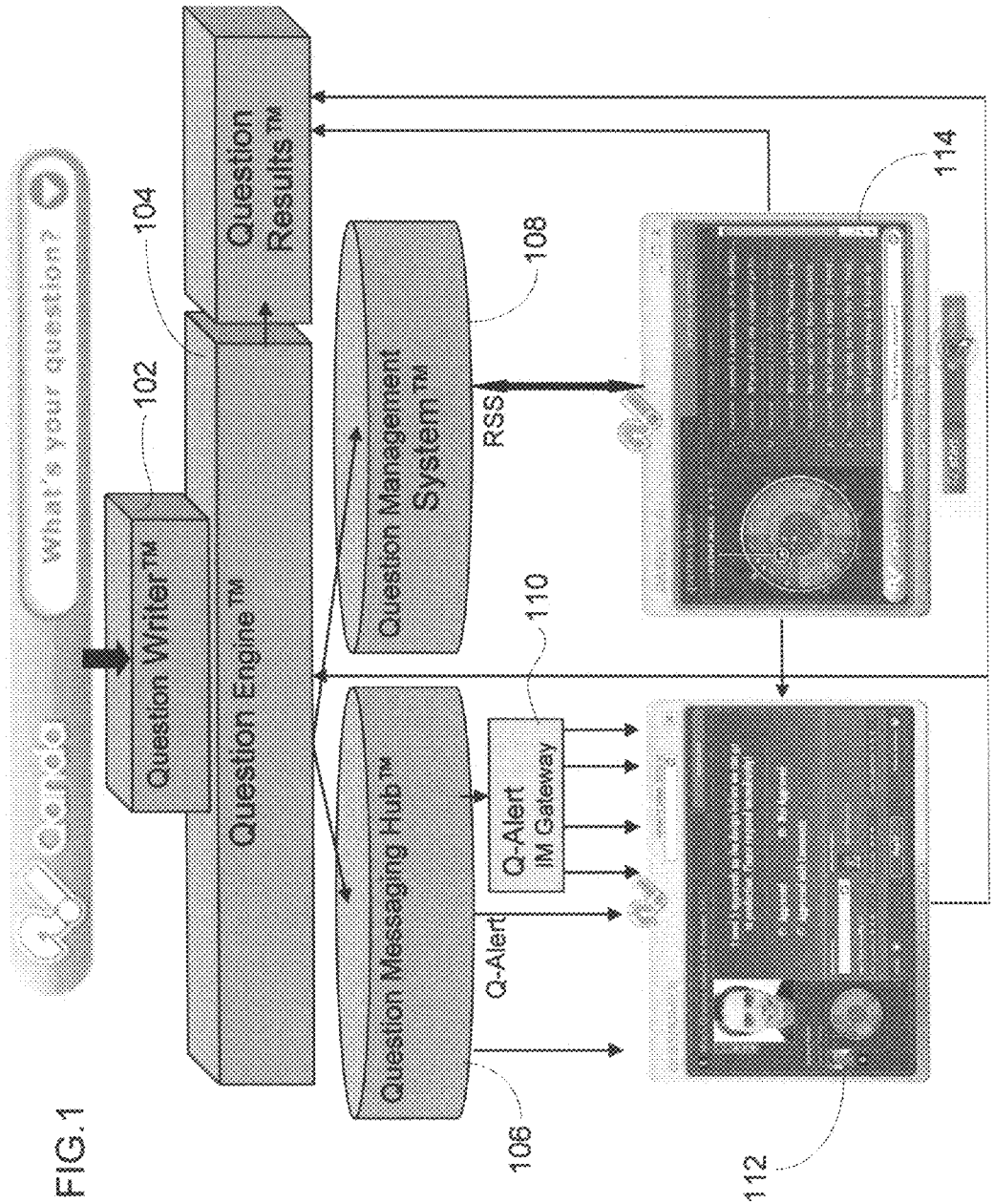
FIG. 1 is a representation of the principal functional elements of the exemplary system.

One embodiment of the present invention provides a system that allows a person to create and manage a set of correspondents, and to send messages, also referred to as queries, that include questions and other attributes such as answer patterns and correspondent data to members of the set. The system then aggregates and quantifies the responses, transmits the query over multiple messaging platforms, and generates various graphical displays of the aggregated responses. FIG. 1 is a diagram of various blocks in an exemplary embodiment of the invention. The system may include a question writing module 102 and a question engine 104 including a messaging hub 106 and a question management system 108. An alert module 110 for instant messaging, SMS or other platforms may be added or included.

In one embodiment, the question writing module 102 helps the user formulate a query including a question and answer pattern. The question engine 104 manages translation, transmission, aggregation and presentation of question and answer data, including presentation of results. The question messaging hub 106 is a gateway to various messaging platforms, such as, for example, email, instant messaging, short messaging and FaceBook. The question management system 108 processes, distributes queries and receives and organizes responses and attachments in a way that a user can access and manipulate the information in various ways.

The question box 112 is a graphical user interface that presents a question to a recipient and enables the recipient to respond to a question. The optional dashboard 114 is a widget that allows a user to ask a question and review pending messages that you or others have authored. The alert module 110, capable of operating on various platforms, alerts a user that a question has been asked of the user.

Figure 2:
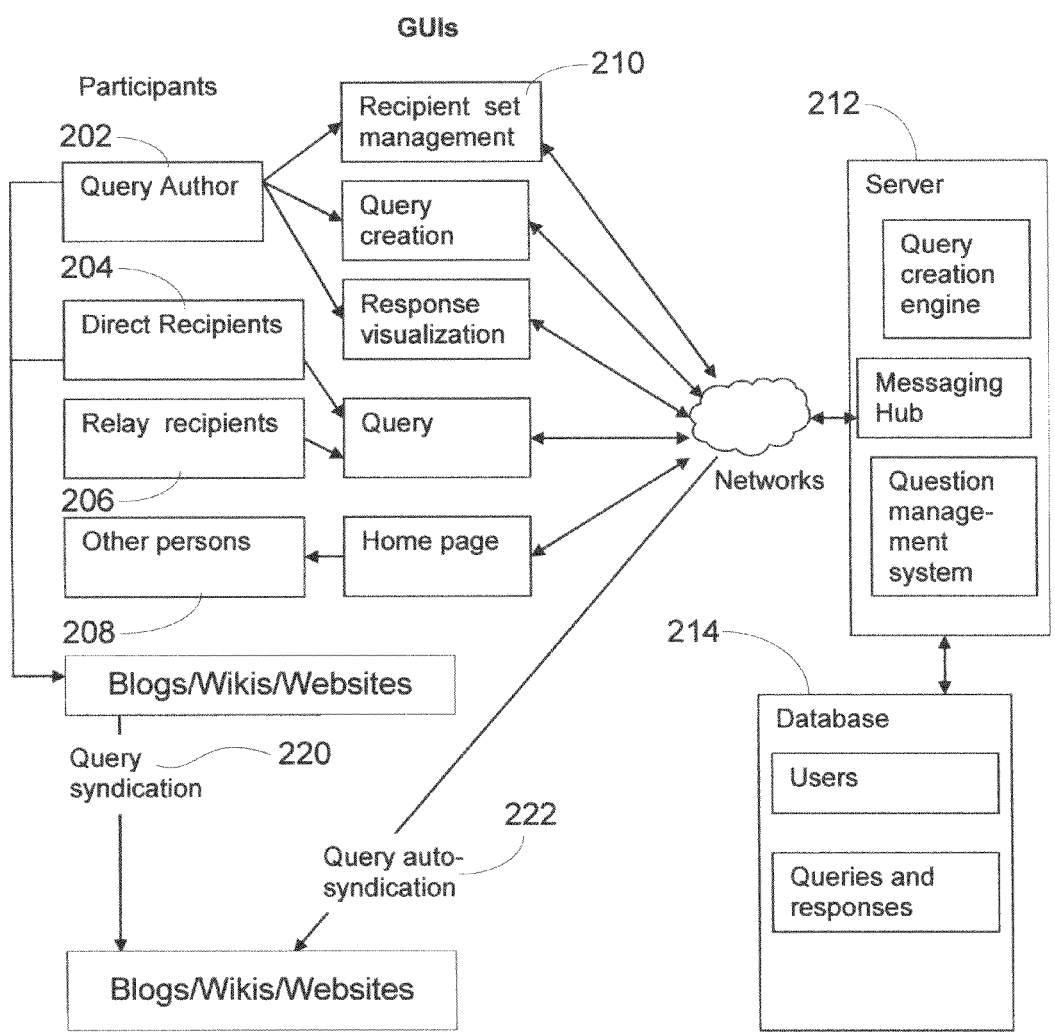
FIG. 2 is a schematic block diagram of an online system in one embodiment in accordance with the present invention.

FIG. 2 is a schematic block diagram of an online system in one embodiment according to the present invention, for the purpose of processing a query. Other or additional queries may have different persons in the roles of query author 202, direct recipients 204, and relay recipients 206. The query author (the person creating the query), the recipients, and other persons 208 may interact with the server through a set of GUIs 210. Instead of using GUIs, persons who interact with the system through devices that do not support graphical displays, such as some short message service (SMS) devices, interact with the server through text-based interfaces. The server 212 may maintain data in the database 214 about all system users and their relationships. The server also may maintain data about each query and the query responses. As is known to those skilled in the art, the server may include multiple computers or other pieces of hardware such as storage devices, and the server may be distributed, e.g., it may reside in several geographic locations. The question writer, also referred to as the query creation engine, aids the query author, via the query creation GUI 304 (FIG. 3), in constructing a query. The question management system aggregates responses and provides results to the author via the response visualization GUI.

The query author may provide contact information for each correspondent. The query may include a question and may have one or more additional attributes, including a list of direct recipients, several answer options, a presentation format, and a lifecycle. For example, the question might be "What vehicle should I buy?" and the answer options might include "Sports car" and "Sedan." The presentation format is the graphical format in which the query will be displayed to the recipients. Query recipients are of at least two types, such as direct recipients and relay recipients. The direct recipients are those selected by the author from the author's set of correspondents, and the relay recipients are persons to whom the query is relayed by other recipients (i.e., by direct recipients or by other relay recipients). The query lifecycle contains rules specifying, among other things, how often the query is sent and when it terminates.

After the query author creates the query, the server sends the query to each direct recipient, relays it upon request when such relaying is permitted, and collects and aggregates responses including response data from all query recipients. Until the termination of the query, the server aggregates the query responses. In one embodiment, this aggregate of the responses is known herein as the query result, also referred to as result data. The server may make the response data and result data available to the query author and to other persons in a number of visualization formats. The server also, to the extent possible, tracks delivery information, including such information as which recipients have had the query sent to them, and which recipients have received or viewed the query. The server makes this information available to the query author and may make it available to other users. Through query syndication 220 and auto-syndication 222, the author or the server may also publish questions and responses on blogs, wikis and websites.

II Trust Relationships

In a number of ways, the processing of a query and of its result by the server depends on the relationships between the persons interacting with the query or on their relationships with the entire community of users. This set of relationships that a person has with other persons is referred to herein as the person's "trust level." A person's trust level may be defined in a unilateral or bilateral manner, in a one-to-one or many-to-one manner and in a manner that is context or subject dependent. For example, person A may assign a high trust level to person B while person B may assign a low trust level to person A. An average trust level for person C may be defined from the trust level all other users have assigned to person C. Trust level may depend on qualities of a person such as the person's expertise on a subject, whether assessed by that person or by others, a person's reliability or promptness in responding to questions, the frequency with which a person is included as a query recipient, the frequency with which a person reciprocates when sent a query, either by responding or by sending other queries to the original sender, a person's honesty or integrity, or the quality of the questions asked by a person. Trust may be explicitly stated, as when a person assigns a trust rating to another, or when a person rates his or her own expertise on a subject, or confidence in an answer. Trust may be inferred, as when a trust relationship between persons A and C is calculated based on person B's trust rating of person C and person A's trust rating of person B. Person A may explicitly state a trust level for person B when making person B a member of person A's set of correspondents, or when responding to a query from person B, or at other opportunities presented by the system. As such, the term "trust level" herein may be defined in any of these manners, or as a combination of any of them.

Because trust level may measure a number of qualities of a user, such as the user's expertise, reliability, and the extent to which the user is trusted by others in a traditional sense, the monitoring and display of trust levels by the system may make participation in the system more compelling for some users, much as score keeping and rankings make video games compelling for some users.

The system may maintain trust level data about any user, and use this data in a number of places. For example, in determining whether a particular user may relay a query to another user, the trust levels of both users may be factors. A user's trust level may be a factor in determining whether the user may view the query result for a particular query. In general, any interaction of a particular user with the server may be permitted or refused by the server based in part on the user's trust level. The aggregation of query responses may also depend on trust level. For example, responses from users with lower trust levels may be weighted less heavily in calculating an aggregate response, or may be ignored entirely. Trust levels may be displayed along with other user information in any GUI suitable for that purpose.

III Participants

The terms "person" and "persons" herein refer to natural persons and/or to agents, i.e., computer programs. A query author is a person creating a query. In an exemplary scenario, a query author specifies a set of correspondents, also referred to as recipients, which are persons to whom the query author may send queries. A user is any person who interacts with or has interacted with the system, or about whom the system has some information. Users include query authors and correspondents, including correspondents who have been identified by an author but who have not yet interacted with the system.

Different levels of user registration may be supported, with correspondingly different levels of privileges or features. For example, registration may require a verification step limiting registration to natural persons, as exemplified by the conventional code verification window shown, or it may require the user to submit an e-mail address and click on a link sent to that address. A registered user also may be given the opportunity to download a program which then runs on his or her computer, and which may provide access to additional features. In one embodiment, agents or information services may be invited or permitted to participate at the election of other users or at the discretion of the system or of the system's operators. In another embodiment, users may participate as query recipients without the need for explicit registration.

FIG. 3 is a schematic diagram of the creation and propagation of a query in one embodiment according to the present invention. The query author in one embodiment uses the query creation GUI 304 to create the query, and the server (represented in FIG. 3 by the home page 306) sends the query to the direct recipients 310, some of whom relay it to relay recipients 320, who may in turn relay it to further relay recipients 330.

IV Queries

A query or message is an object created by a query author, with or without the assistance of the question writing module, which is sent to other persons. A query may include content, state information, a pattern, and result. When a person receives a query, the person has an opportunity to respond. In one embodiment, these responses, and aggregates of the responses, then become a part of the query, known as the query result.

A query may contain content such as a question posed by the query author, such as "What college should my daughter attend?" Instead of or in addition to a question, a query may contain an offer (e.g., "My tickets to tonight's game are available"), a request, a promise, or any other of what is known to those skilled in the art as speech acts, including an assessment and a declaration. All of the foregoing may be referred to a question. This text supplied by the author is referred to herein as the question or query request, and is part of the query content. When a query contains answer options, such as "I'll take the tickets," or "No thanks, I'm busy," these may also be part of the query content in the form of response data.

A query may also contain state information, and the state of a query may change in response to certain events. An example of query state information is whether the query is open or closed. When a query is closed, recipients are not permitted to respond to the query. A query may transition from open to closed automatically or under the control of the query author, for example after a deadline has passed, after the query author has made a final decision on some matter, or after a certain response or number or responses has been received. For example, a query in which the query request is "What school should my daughter attend" might automatically transition from open to closed after the decision deadline set by candidate schools has passed. A query in which the query request is "Does anyone want my tickets to tonight's game?" might transition to closed upon receipt of the first affirmative response. Part of the query state information may be recipient-specific. For example, a query for which the query request is "Do you want to buy some cookies?" might transition to a state in which user A, who has answered in the affirmative, is prompted for a quantity, while user B, who has not responded, is shown the initial query request. Yet another user interacting with the same query may have answered in the affirmative, may have specified a quantity, and may be prompted for credit card information.

The processing and changes of state of a query may be governed by a set of rules, specified by the query author, referred to herein as the query lifecycle, which is part of the query pattern. The query lifecycle contains rules governing the relaying of the query and the viewing of the query and its result, and rules specifying processing actions triggered by query events. An event, as is known to one skilled in the art, is any externally or internally triggered change of state. Examples of events are the passing of a deadline for responding to a query, the number of query responses reaching a preset threshold, or the receipt of an affirmative response. The query lifecycle may specify actions that result when a change of state occurs. Such actions may include the sending of e-mail or the transmission of information, e.g., via RSS, to an outside service. For example, when a query with the query request "Do you want my tickets to tonight's game?", transitions from open to closed (at the receipt of the first affirmative response), the system might send a confirming message to the successful claimant, and a message identifying the successful claimant to the query author.

The query pattern also contains such information as whether the query has answer options, the number of answer options, and whether a recipient may include comments with his or her answer.

V Question Engine

In one embodiment, the question engine includes the question management system and the messaging hub. In one exemplary embodiment, the question management system runs in the server. It continually aggregates the query responses, updates the state of the query within its lifecycle, and takes any actions specified in the lifecycle for the corresponding change of state. For example, it may iterate (resend) the query, or escalate the query (send the query to a different recipient), if the original recipient has not responded within a specified time. Subject to rules specified in the query lifecycle, the question engine also outputs status information via RSS feed to any person who subscribes to such output.

Messages, such as queries, may be sent through a messaging hub in the server which interfaces to multiple messaging networks. Another example of a message is a status update sent to a query author when the state of a query changes. In one embodiment, the system is capable or communicating over different types of messaging networks including instant messaging 710, SMS/Mobile 720, sitemail such as FaceBook 730, and e-mail 740, as illustrated in FIG. 7. In one embodiment, a set of rules may specify which network to use. In one embodiment, instant messaging may be generally preferred over SMS/Mobile, which may generally be preferred over e-mail. The hub may send the message out on only the most preferred network, or on the most preferred of the networks on which a user is present, or on several networks simultaneously. The hub may send the message out on a first network, and if no response is received within a specified time, the hub may resend the message on a second network. These rules may be specified in the query lifecycle or they may be rules to which the server defaults, or a combination of such rules. The hub also translates, or normalizes, the question to all involved networks simultaneously, for example by formatting the question as a link or uniform resource locator (URL) for the instant messaging network, and as a short text string for SMS.

In one embodiment, when the network used is a mobile wireless system, a query is sent by one of two methods: (i) using SMS and (ii) using SMS with a wireless access protocol (WAP) push message. In the first method, the recipient receives the query in the form of an SMS message including the question and numbered answer options, and replies with an SMS message including the number of the selected answer option. In the second method, the recipient receives the query in the form of an SMS message including the question and a WAP link to a mobile-optimized page displaying the query, hosted on the server. When a query is sent using the second method, the recipient has a choice between replying (as in the first method) with the number of the selected answer option, and replying via the WAP link. SMS query responses are received using an SMS aggregator connected to all SMS carriers. The query result for each query is made available to mobile users on a mobile-optimized version of the result web page, to which the user receives a WAP link; in addition, the query result itself may be sent to the user in SMS form.

VI Layered Query Definition and Query Markup Language (QML)

In one exemplary embodiment, system allows a user to create a structured message that is sent to one or more groups of people at once. The message may contain a static body and a dynamic structured element. The static body may be sent through any messaging system and contains a link to the dynamic element. The dynamic element provides for a level of interactivity and may define the range of possible responses. The dynamic element may be rendered in various ways depending on the platform from which the message is viewed. The dynamic element may be rendered directly in the message in certain cases.

Responses to queries need not be sent directly to the author or other recipients. As the responses are collected, the system aggregates the responses and produce a summary result as well as access to the detail of the response. The aggregate may be rendered in various ways depending on the platform. The user can potentially manipulate the aggregation and initiate new messages from the rendering of the results.

In one embodiment, the message, responses and result are represented in the system as content that can be organized in a similar manner as any user contributed content on any web site. For example the content may be organized topically, by audience, or by date. Contextual organization of the content allows the author to influence one or more of the following for future questions in this and other message sequences. Context may include one or more:
  a. Time of day or date
  b. Number and nature of other messages and actions
  c. Perceived importance of the author
  d. Perceived importance of the other recipients
  e. Perceived obligations/expectations for behavior
  f. Perceived effects/side effects of possible responses
  g. Recipients purpose, values
  h. Cost of various possible actions (Example, recipient may not respond if there is no way of physically responding as desired or if the relative cost is too high)

Much of electronic messaging is currently done through email and instant messaging. These tools typically require that the user be running the messaging application or web service. HTML contains markup that may be placed on any web site that causes a new email editor window to open for the user. In one embodiment, the system exposes markup that when placed on a website provides links that allow the user to be able to create a query, a structured message that is sent to a group of people at once. This markup can also be implemented as a widget, plugin, addin or other application to make the ability to create, respond to and manage queries available to the user from where ever they might be or whatever they are doing. This capability of the system to create ubiquitous access to the creation of structured messages makes it easier for the user to choose a messaging tool and design an interaction the user wants to produce with the audience to advance the purpose. It also may reduce the cost and time to send a message.

In one embodiment, prior messages are defined as content by the message, response and result documents. The result document may be computed from the message and response documents. In one embodiment, the message document dictates the form and range of the response documents. The message document consists of data that describes the specific message as well as data that describes the common elements across similar messages, which may be referred to as content and pattern data respectively. For example, if a user asks a group of people a yes/no question about whether they have been to Paris, then the content data contains the question about Paris and the pattern data specifies that this is a yes/no question. Content data may also contain parameters that modulate the pattern. For example, the content may say that a comment may be included in the response. The pattern data may say that a comment is possible if indicated by the content.

Therefore in one embodiment, the:
Result ->depends on Response(s), Message
Response(s) ->constrained in form and range by Message
Message ->contains:
  Authorship
  Pattern data
  Content data
Content data ->data and parameters specific to this message
Pattern data ->description of elements common to multiple potential messages.
Pattern data itself may be composed of elements describing one or more of:
  1. presentation of the message while it is being authored;
  2. structure, default data and parameters of the message;
  3. presentation of the message when it is viewed by the recipient (recipientView);
  4. structure of the response data;

5. method for aggregating response data into a result;
6. structure of the result data;
7. presentation of the result data;
8. Possible connections between the creation, response and results documents to other messages as part of a sequence. For example: in the sequence we are currently considering this data says that a recipient may generate a response document upon receiving a message and that each time a response is received that a result document will be re-calculated from the initial message and response documents.

Each of the data elements of the message document above may be viewed as objects that can act on the other specific objects or generic ancestors of those objects. Each unique object may be accessed using a URI to the message document and a globally unique identifier (GUID). Because of this ability to access the elements (objects) of message documents with a globally unique identifier, new message documents can be composed by referencing or extending objects in other message documents.

In one embodiment, the ability to composite message documents from already existing elements allows a new message document to have a relatively small and simple representation. For example, returning to the example of the message about Paris and refer to the elements of the pattern data. If the message simply reuses a previous yes/no pattern without any other change, then the message document can refer to a URI of an existing Yes/No question (root message) and not include items 1-8 relating to pattern data. If the user wanted to customize just the background image of the question (an attribute of item 3), the document may additionally contain a reference to the recipientView element from the root message and extend that object by redefining the recipientView elements background attribute.

In one embodiment, the original authorship of each message is included in the message document. The messaging corpus consists of the set of all messages ever created and each object in each document is accessible (within security requirements) by a globally unique identifier on the computer network, such as the Internet.

In one embodiment, a query is defined at three levels or layers known as structure, pattern, and content. All three layers are represented using query markup language (QML). QML is a markup language based on the extensible markup language (XML).

The pattern layer contains the query lifecycle and the format and skin of the query when represented in graphical form. The skin of a user interface, as is known to those skilled in the art, is a virtual layer defining aesthetic characteristics in a manner largely independent of the other characteristics of the user interface. Examples of skins include "corporate," "gaming," "art deco," or "comic book."

The content layer contains the query request and answer options. As such, a given pattern may be re-used with different content. For example, query author A may write a query containing the query request "Which type of vehicle should I buy?" and containing answer options "sports car," "mini van," and "motorcycle." This query may have a lifecycle specifying that after one day, the query be resent to any recipient who has not responded. If author A specifies that the query pattern is viewable by others, then author B may copy the query, and change only the content, for example changing the query request to "Where should I go for vacation?" and the answer options to "New York," "Los Angeles," and "Paris." Author B's query will then also be resent to any of author B's recipient's who have not responded within one day.

VII QML Declarative Data Format

In one embodiment, the described documents may each be represented by unique resources on the computer network. In the case of the Internet, these documents might be expressed as XML and retrieved via the HTTP protocol. Presently HTTP delivers textual documents largely in the form of XML or HTML (and its variants). Unlike traditional XML, this document contains specifications for data formats, presentation, aggregation and relationships of documents as parts of larger sequences. Unlike typical HTML, this document contains much more than presentation information.

In one embodiment, the system expresses the message and other documents above as XML by representing each element in a declarative format suitable to the type of declaration we are making. The declarative format describes the data, presentation, and relationships between objects and data without defining a specific procedure or processing instructions. This allows the creator of the document to express only the relationships and leave the details of processing to other elements of the messaging system. The ability to interpret and process these declarative specifications may be referred to as part of the structure of the messaging system.

For each element of the response document, there are declarative grammars that are suitable for expressing those relationships. A subset of those grammars is useful for expressing specifications that are supported by the structure of our messaging system. In the example below, each element is part of a containing XML document.

| Data Element | Examples of declarative specifications |
| --- | --- |
| header (Authorship, creation data) | generic XML |
| content | generic XML |
| pattern | |
| authorView | HTML, XForms, Laszlo, Flex |
| messageStructure | XML schema (XSD) |
| messageParameters | generic XML |
| recipientView | HTML, XForms, Laszlo, Flex |
| responseStructure | XSD |
| resultAlgorithm | XQuery |
| resultStructure | XSD |
| resultView | HTML, XForms, Laszlo, Flex |
| object extension and inheritance | IDL |
| Connections and dependencies | Biztalk, TIBCO Message Broker, Workflow metadata |

The described format is merely one conceptual example of how to define aspects of the exemplary system.

VIII. Collaborative Filtering

The domain of messaging topics is any topic of perceived relevance. If the process of selecting content to reuse during message creation can be improved that the relative value of message content can be increased. For example, a user may quickly reduce the search/decision space of what content to re-use from a set of past messages to a comprehensible set of relevant choices. A user may also reuse message patterns created by other users. Further, the value of past messages may be approximated by measuring characteristics of past messaging sequences (approximateValue).

Collaborative filtering reduces the decision space and as a result increases the possible range of specialized communications a user can choose from and apply or the message processing space available to contemplate alternatives resulting in more effective choices. Collaborative filtering chooses to use limited resources to deliver a subset of messaging content to a user that maximizes the potential value of the message by statistical correlation to the implicit value of the same information to other users based on measurable aspects of that communications that are correlated with the messaging value function By using collaborative filtering, one embodiment of the system achieves increases in relative value:

1. approximateValue is computed for each message sequence
2. the dimension of approximateValue is added as a search vector in the message corpus.
3. The search is constructed using user context, keywords, permissions and other criteria. Search criteria is constructed both explicitly (by the user typing something) and implicitly (by looking at their history of previous interaction and profile)
4. The search produces a small list of relevant content for re-use ordered from highest approximateValue.

IX User Profiles

Figure 4A:
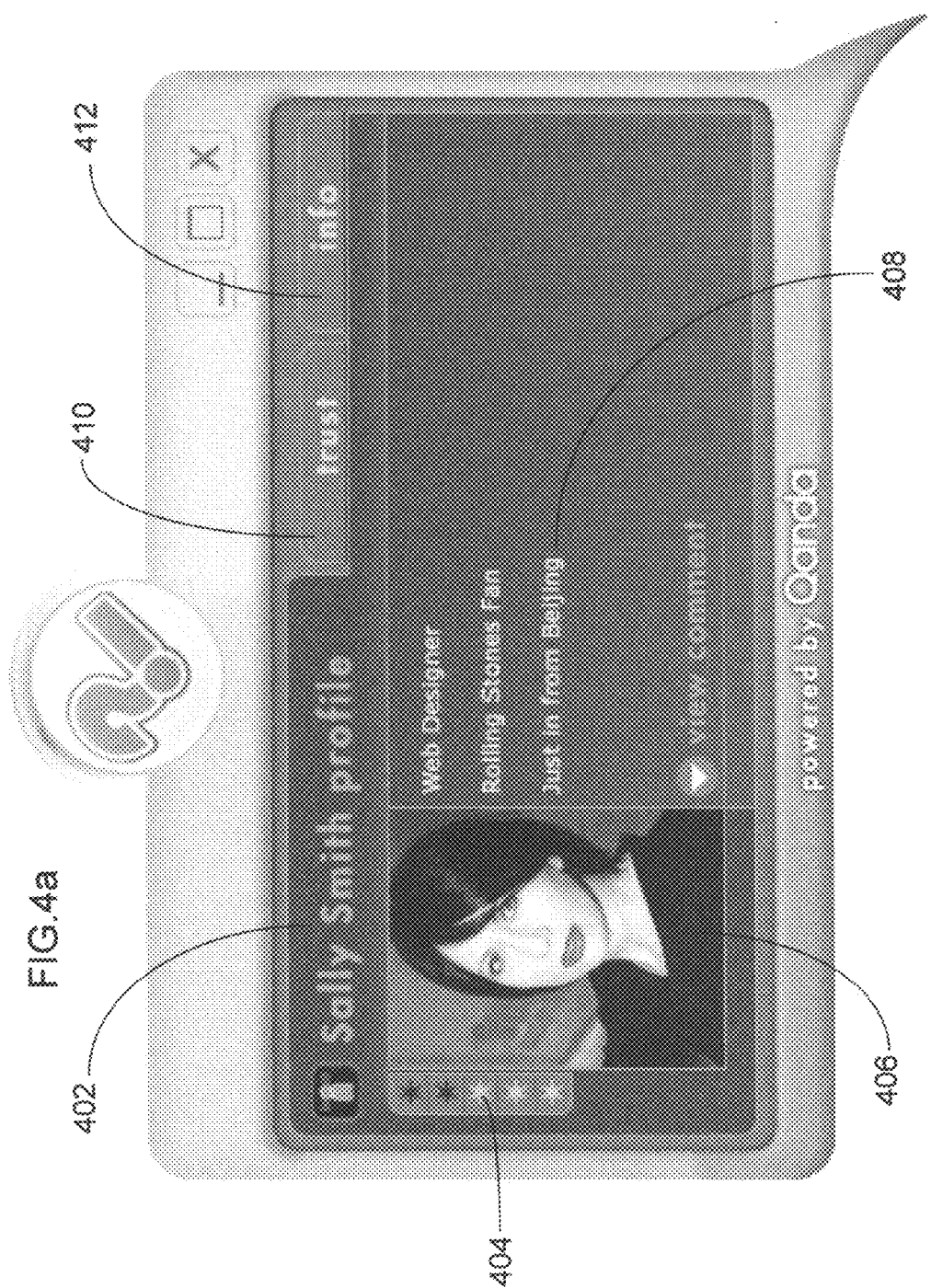
FIG. 4a is a screen shot of the main tab of an exemplary profile Graphical User Interface (GUI)

The system may maintain profile information for each user in the server database. This profile information may be entered by the user, or it may be used from one or more other social networks which have memberships, such as instant messaging systems, particularly if the profile information conforms to a structured profile standard such as Friend of a Friend. The profile GUI, shown in FIG. 4a and 4b, displays profile information. Referring to FIG. 4a, the main tab 402 of the GUI displays the user's trust level using a five-star rating display 404, a photograph of the user 406, and miscellaneous additional information 408. Such information may also be presented as part of a query GUI (FIG. 13a), or on other parts of the system. The profile GUI also includes a "trust" tab 410, containing information about the user's trust level, and an "info" tab 412, containing further information about the user.

Referring to FIG. 4b, if the profile is being viewed in the context of a particular query, then the profile GUI contains a "view comment" button 418 which if clicked causes a comment window, which displays the user's comment in response to the query, to drop down.

Referring to FIG. 4c, an alternate embodiment of the user profile GUI is shown. The GUI includes contact information 430, name and profile information 432, 434, and a picture upload application 436.

X Correspondent Management

Figure 5A:
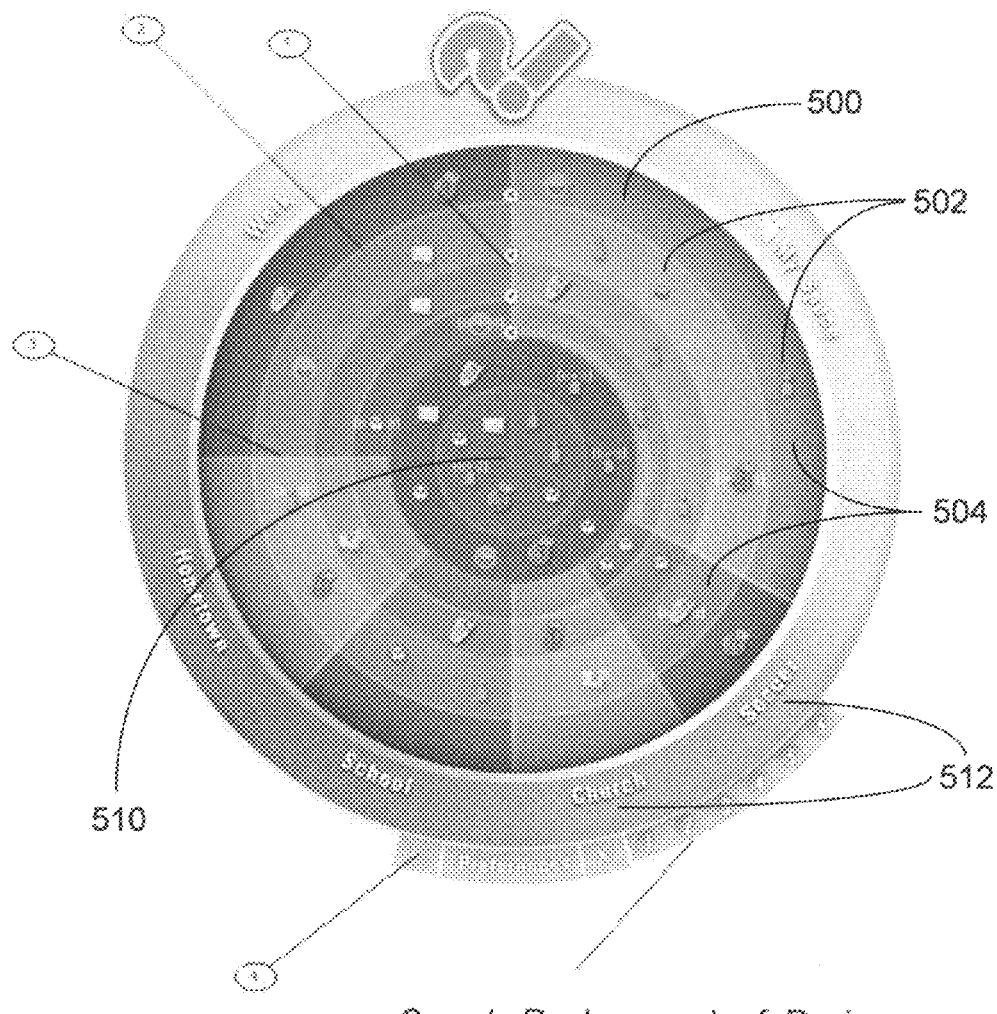
FIG. 5a is a screen shot of an exemplary correspondent management GUI.
Figure 5C:
FIG. 5c is a screen shot of several exemplary icons used to represent correspondents in the correspondent management GUI.

FIG. 5a shows the correspondent management GUI in one embodiment according to the present invention. Using this GUI, the query author provides contact information for each correspondent and the author specifies a trust level for each correspondent, for example using a number in the range 1-10. The author may also use the GUI to edit any previously-specified correspondent information. Inside the outer perimeter 500, the GUI contains the circular correspondent display, which in one embodiment may be referred to as the user's "Universe." Each icon 502 in the circular correspondent display represents one of the author's correspondents. The appearance of each icon indicates the messaging network to be used for that correspondent, and, if available, presence information 504 for that correspondent. Examples of the icons used to represent correspondents are shown in FIG. 5c. The mouseover for any of the icons representing users is a short summary of the correspondent's profile, including a photograph. As is known to those skilled in the art, a "mouseover" for a piece of text or for a graphical object is a popup window displayed in response to the user's positioning the mouse over that text or graphical object. Active wave symbols 504 in an icon indicate that the correspondent is present on the messaging network.

In one embodiment, when an author first starts the correspondent management GUI, the GUI prompts the author for the author's instant messaging screen names 610 and passwords, 612 using a GUI like the one shown in FIG. 6. If the author so chooses, the screen names and passwords are stored in the server's database, making it unnecessary for the author to provide them in the future. In one embodiment, if the author does not provide screen names and passwords, then he or she is required to re-enter them each time he or she uses the system as an author.

Referring again to FIG. 5a, each correspondent's trust level is indicated by the proximity of the correspondent's icon to the center 510 of the GUI. Those with the highest trust level are in the innermost circle and those with lower trust levels are in one of a set of concentric circles of larger diameter. When the zoom icon is clicked, the GUI format toggles between a normal format (shown in FIG. 5a) and an expanded format, in which each of the 10 trust ratings is represented by one of 10 concentric circles.

The GUI is divided into up to 9 sectors 512, labeled at the perimeter of the GUI, corresponding to groups such as Work, Hometown, or School. Each correspondent is assigned by the author to a group. The group typically corresponds to the community within which the author has become acquainted with the correspondent. As icons are added or moved (using drag and drop) on the GUI, and as groups are added or deleted, the GUI automatically adjusts the size of the sectors so that the angle subtended by each sector is proportional to the number of icons in the sector.

In one embodiment, there are five ways for an author to add correspondents: importing from an instant message buddy list, importing from e-mail or contacts application programming interface (API), importing profile information from an existing online social network, sending a copy of an e-mailed query to the server, or manually copying and pasting a correspondent's information into the GUI. In other embodiments, any other suitable ways for adding correspondents may be used.

Referring to FIG. 5b, sets of correspondents may be selected in the correspondent management GUI in several ways. Clicking on the perimeter of a sector selects or deselects that entire sector, each of which, in one embodiment, may be referred to as one of the author's communities, also referred to as groups or circles 520. Clicking on one of the small circles at the intersection of one of the concentric circles and the vertical radial line selects or deselects all correspondents within the corresponding concentric circle. In addition, arbitrary subsets of correspondents may be assigned numbers and later selected by clicking on the corresponding numbered subset button. The numbered subset buttons are on lower right portion of the perimeter of the correspondent management GUI. The correspondent management GUI may be used by the author to select direct recipients for a query. Preferences 540 for groups and the system as a whole may be accessed to the outside of the concentric GUI display.

Referring to FIG. 4b, if the user whose profile and comment are displayed is one of the viewer's correspondents, then the correspondent's position in the viewer's circular correspondent display 420 is shown. In one embodiment, when the user profile GUI is displayed in any GUI in which the user is represented by an icon or other small symbol, the user profile GUI is positioned so that its tail 422 is on the symbol representing the user whose profile is displayed.

Figure 5D:
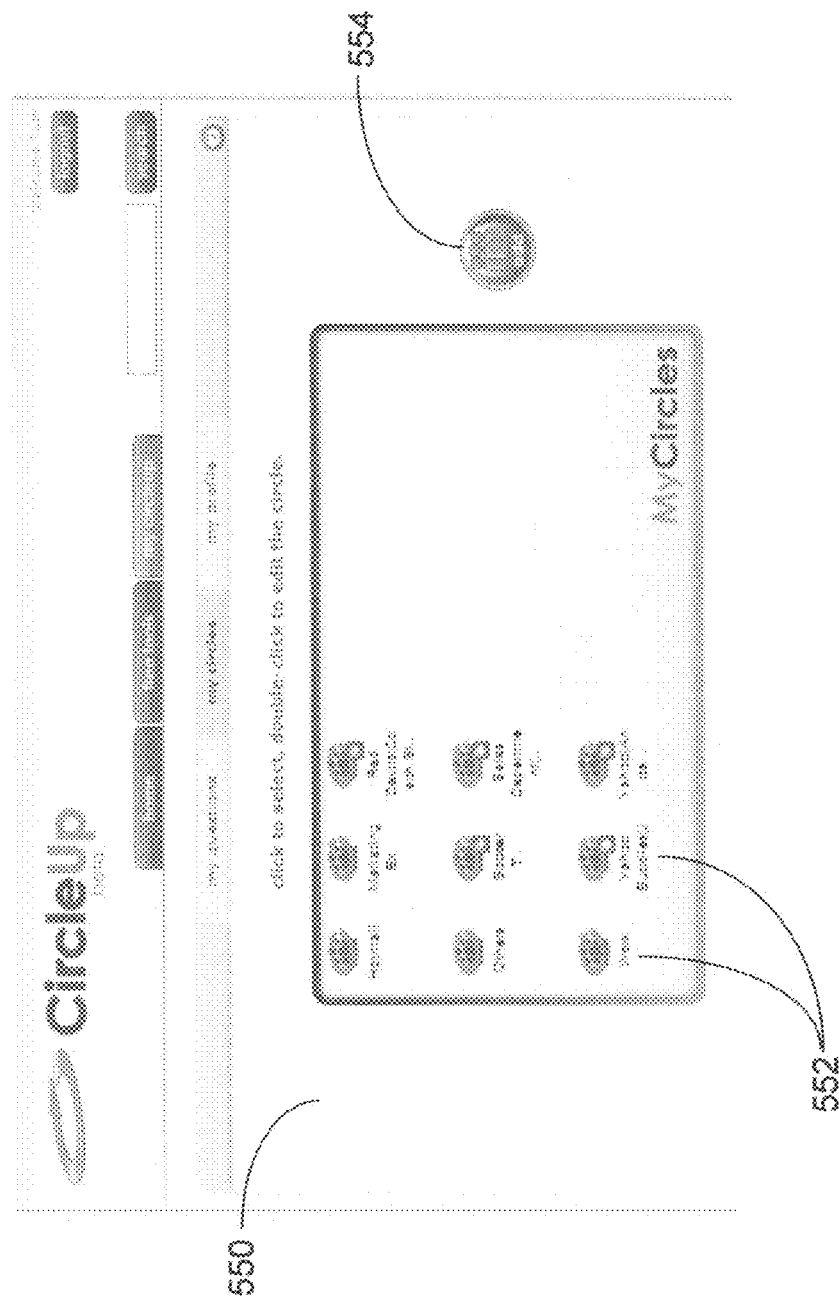
FIG. 5d is a screen shot of an alternate embodiment of a GUI for representing circles or groups.

Referring to FIG. 5d, an alternate embodiment of a correspondent management GUI is shown with a simplified interface 550 illustrating icons 552 representing circles or groups of correspondents for a particular user. The user simply clicks on the desired icon to edit the group, or clicks on an "add" button 554 to add new circles. Referring to FIG. 5e, clicking on an icon opens a detail page 556 that lists all of the correspondents 558 within the circle and specifies the preferred channel 560 for communicating with the correspondent.

XI Description of Shared Circles

When a user addresses a message, they may form a group (circle) from the individual addresses at the time of messaging or beforehand. The user may share this circle with other members of the circle, such that each member of the circle may address messages without having to specify or know individual addresses. Furthermore these individuals may have multiple addresses on multiple messaging channels. Different individuals may not have access to all the messaging channels (for example a user may not have a Yahoo instant messaging account and one of the members of the circle may have a yahoo IM account). But, the system can deliver messages to users as long as the sender has a channel in common with the recipient. The circle can be shared with various rights, including send, view, edit, add, delete, and share.

These rights allow users who have the circle shared with them to be able to send messages, view the actual addresses in the circle, edit addresses in the circle, add new members to the circle, delete members from the circle and share the circle with others, respectively. These rights are grouped into roles so that a set of rights can be conveyed as a package. For example, the admin role encompasses all the listed rights.

When a circle is shared or a shared circle is changed, messages can be automatically sent to all affected users. These messages can be used to welcome and orient members to the changes and associated opportunities. For example, when a circle is first shared, users can receive a welcome message letting them know that they can send messages to anyone on the circle.

XII Multi-Platform Messaging

The system manages messaging by person or identity rather than address. As shown in FIG. 5*c*, a user may have an email, Facebook, AOL Instant Messenger, Yahoo Instant messenger, SMS or other address. The system allows a user to send a message to the user on any supported channel (in some cases, the sender must have an account on the channel, for example a Yahoo IM id). The system will use the preferred channel to deliver the message but can use an alternative if circumstances warrant it. For example, the preferred channel is unavailable. The user can set the preferred channel on a circle by circle basis and a recipient may be a member of more than one circle. This allows the sender to cause messages related to specific topics to be sent to a specific address. For example, work related messages to a work address, messages regarding the soccer team to another address.

A user does not need to be a registered user on the system in order to receive and respond to messages. This enables a sender to include anyone in their messages without having to have the recipient register.

XIII Query Creation

Figure 9B:
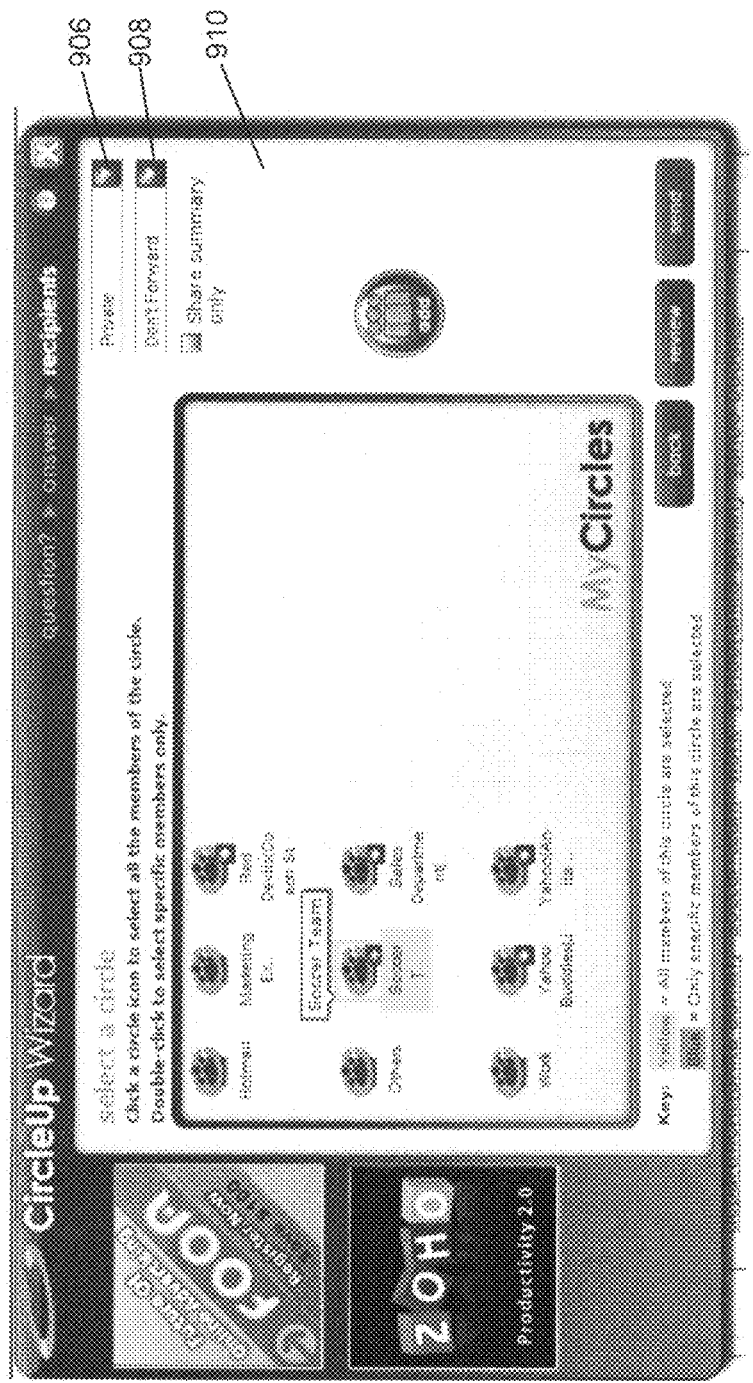
FIG. 9b is a screen shot of an exemplary circle selection GUI in which all or certain members of circles are specified.

The system toolbar, shown in FIG. 8 is in one embodiment a structure 802 that exists in a variety of technical forms as an object embedded in other applications such as browsers, IM clients, and blogs. It presents a method of inputting a question 804 from a local desktop which triggers the query creation process without having to visit the server home page. In another embodiment, the query creation wizard GUI, shown in FIG. 9*a* and FIG. 9*b*, is used by the author to create a query in one embodiment. It includes steps in each of which the author is prompted for different information needed for the creation of the query. In step 1, entitled "What's your question?" (FIG. 8), the author enters a natural language question. The server's query creation engine then parses the question for meaning and result, auto-senses the semantic structure, topic and meaning of the question, and suggests to the author changes in wording and a preferred answer structure.

FIG. 9*a* shows the query creation GUI, at step 2 of the query creation process, entitled "answer Options." At this step the author enters the options from which query recipients will choose. For example, as shown in FIG. 9*a*, the author may specify a multiple-choice answer 904 format and several multiple-choice options from which the recipient will choose.

FIG. 9*b* shows step 3 of the query creation GUI, entitled "Delivery Options and Customization." Using the input fields in this step, the author specifies the degree to which a query may be relayed and viewed by others. For example, the query result may be viewable by anyone, it may be viewable only by the query author (private) 906, or it may be viewable by some set of persons specified by the author, e.g., correspondents in a certain group, or persons with a certain level of trust. The author may be able to specify both the rules under which a query may be relayed 908 and the rules under which its result may be viewed 910. The system may provide preset combinations of rules from which the author may choose.

In another example, the author may be able to classify the query as a "private" query 906, a type of query which may be predefined in the system as one which may not be relayed and the result of which may be viewed only by the author. As another example the author may classify the query as "public," in which case all users may be permitted to relay the query, post it on blogs and wikis, or make it available via syndication. The system, or other systems, may be able to select the query for auto-syndication. In step 3 of the query creation GUI, the author may also specify other aspects of the lifecycle of the query.

In step 4, the query author specifies direct query recipients by selecting a circle or group 910 to which to send the message. After the author completes step 4 of the query creation GUI, the query information is sent to the server. The server then begins processing the query according to its elements and attributes, and, as they are received, aggregating query responses into the query result.

XIV Query Recipient Interface

Figure 10:
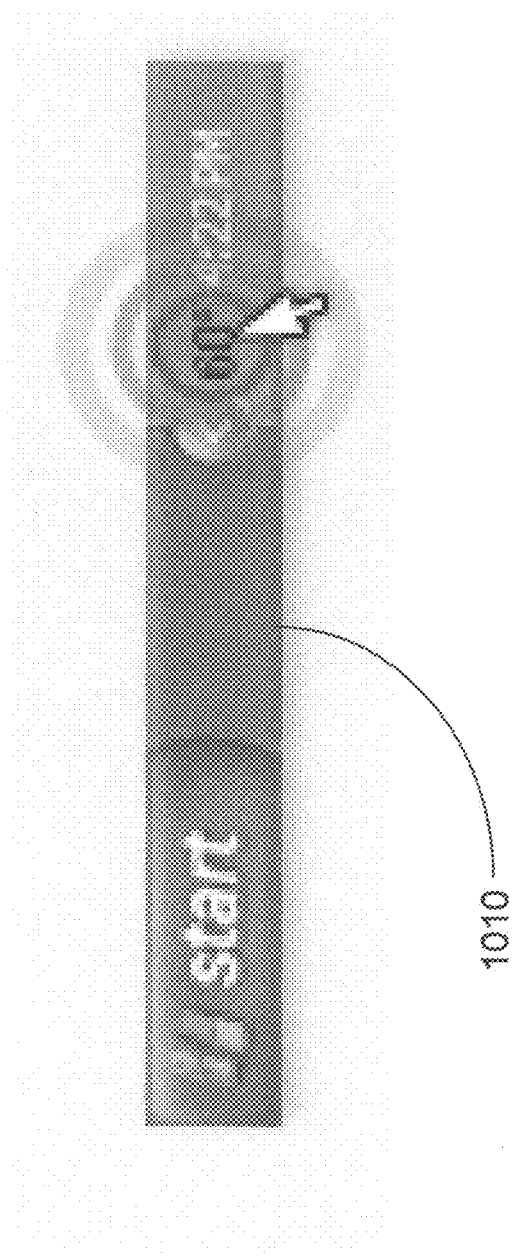
FIG. 10 is a screen shot of an exemplary toolbar alert GUI.

If a user so chooses, the toolbar alert GUI 1010, shown in FIG. 10, can be added to the user's Windows toolbar. The user is then alerted by a change in the appearance of the toolbar alert GUI when a new query arrives from one of the user's correspondents. The toolbar alert GUI also alerts the user when a notification watch has been triggered on the server and when the status of any query authored by the user changes. A notification watch is an author-specified state change, which, when it occurs, causes the author to be notified.

When the toolbar alert GUI indicates that the status of a query has changed, clicking on the toolbar alert GUI causes a status and progress GUI to be displayed. The status and progress GUI shows the status and progress of the query. Changes in status may include such events as the aggregation of a sufficient number of responses to make the query result statistically significant, and the termination of a query.

Figure 11:
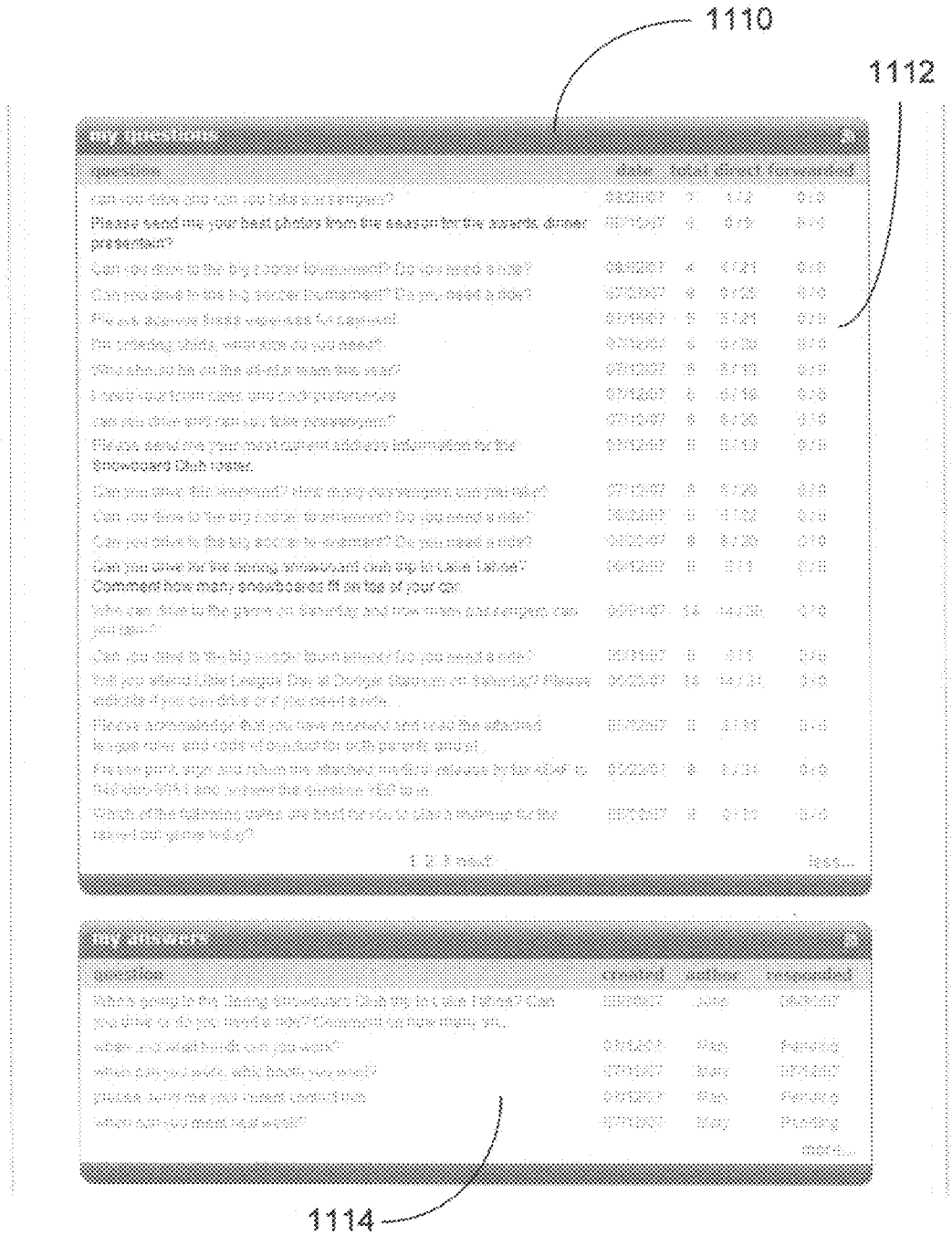
FIG. 11 is a screen shot of an exemplary query list GUI, with the "my questions" list expanded.
Figure 13A:
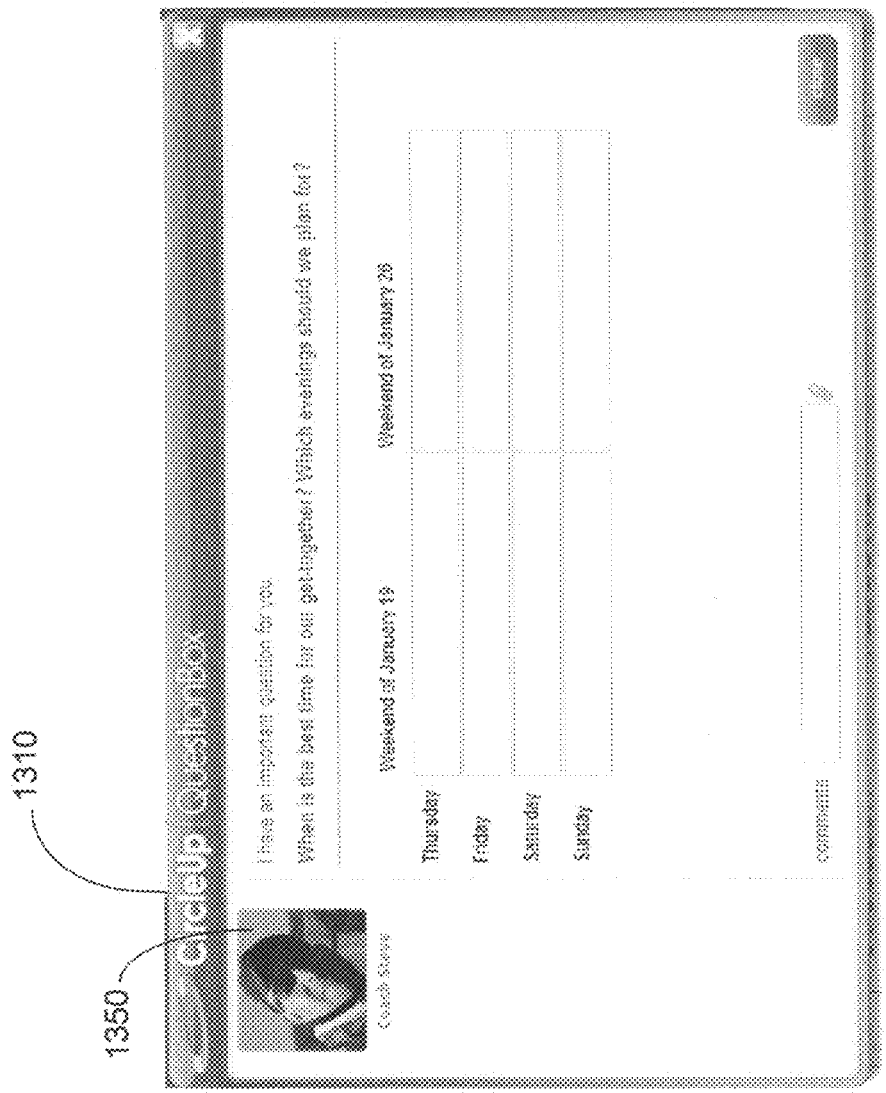
FIG. 13a is a screen shot of another exemplary query GUI.

The query list GUI 1110, shown in FIG. 11 is available in one embodiment to both query authors and query recipients. This GUI shows a list of questions 1112 and the status of answers 1114. Selecting a query in the inbox causes the query GUI 1310, several exemplary variations of which are shown in FIG. 13*a* and FIG. 13*b*, to be displayed. One GUI 1312 contains an answer pattern soliciting approval or disapproval. Another GUI 1314 requests the correspondent to fill in the blank, and yet another 1316 asks who may want to take tickets to a sporting event. The query list GUI may be available in many forms, such as a standalone program, or a client plug-in.

Figure 12:
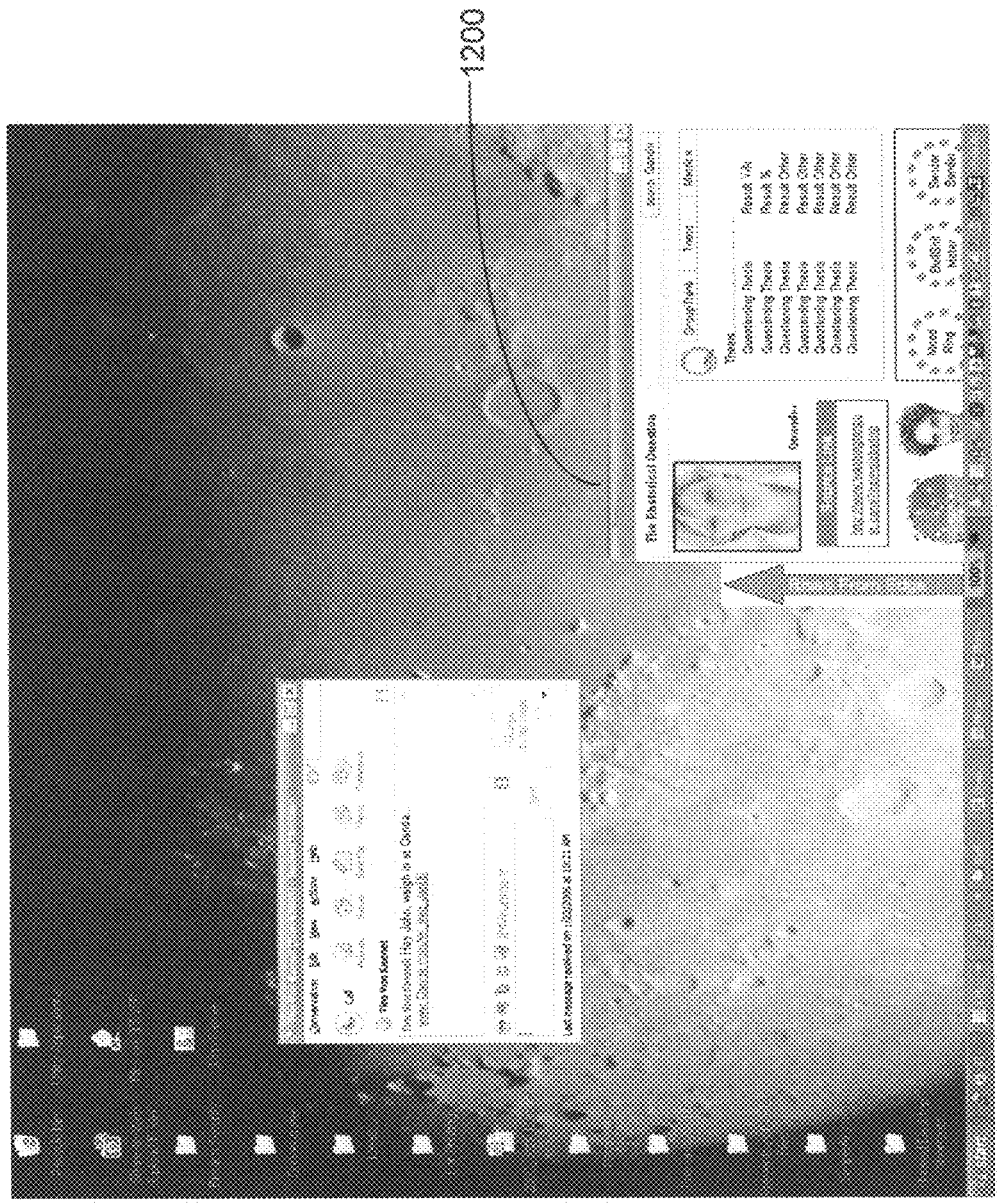
FIG. 12 is a screen shot of an exemplary query GUI, showing an exemplary mode of on-screen appearance of the query GUI.

In one embodiment, the query GUI may be displayed when the recipient clicks on a link received in an instant messaging message, e-mail, or other suitable communication. For example, a blog might contain a controversial question which might appear in the text of the blog, and a reader might choose to answer by clicking on the question and responding to the query widget which appears. The query result would then be aggregated in the related results display adjacent to the blog text, and at the same time be updated to any syndication of those same results that might appear anywhere on the internet. A widget, as is known to those skilled in the art, is a user interface that operates outside the frame of a browser. The query widget might rise smoothly and continuously from the bottom edge of the display until in full view, in a zero-permission fashion, i.e., without any further user intervention such as granting permission or downloading an application. Because the recipient need not grant permission nor pre-install software, the lends itself to convenient adoption during use by new users. The rendering of the query is optimized for the format of the display of the recipient. By way of example, FIG. 12 is a screen shot of an exemplary query GUI, showing an exemplary mode of on-screen appearance of the query GUI 1200.

Referring to FIG. 13a, the query GUI displays a photo 1350 of the query author. In another embodiment, a photo of the relay sender (the person who relayed the query to the recipient), a presence icon for the author and one for the relay sender, and an indicator showing whether relaying is permitted by the author. The recipient's circular correspondent display included in the query GUI shows the relation of the relay sender to the recipient. The mouseover for each of the two photographs is that person's profile. Presence information is useful to the recipient if the recipient wishes to chat with the author or relay sender.

In another embodiment, the recipient may select from a set of response options, add comments in a comment box, view other query responses using the answer tab, view information related to the query by visiting a set of source links, rate the quality of the question, the sender, and the recipient's expertise using three sets of rating stars, block further queries from the sender using a block sender button, send the query response using the reply button, or generate a new query by entering a question in the new question box. The comment box expands to accommodate a larger number of characters when the cursor is in it, i.e., when it has focus. The "answers" tab contains a display of the query result and is available to the recipient only after the recipient has responded to the query. The mouseover for each set of rating stars explains the meaning of the corresponding rating. Ratings provided by the recipient using the rating stars may be used in calculating the trust level of the recipient or the sender. When a query recipient completes a response and clicks "Reply" in the query GUI, the response is sent to the server. If the author has permitted relaying, then after the recipient clicks on the reply button, a relay window is displayed which collects information for relaying the query. When the recipient has finished interacting with the query GUI, it moves smoothly and rapidly off of the right edge of the display, leaving behind animated images of smoke puffs which then fade away.

XV Query Result Output

Figure 14A:
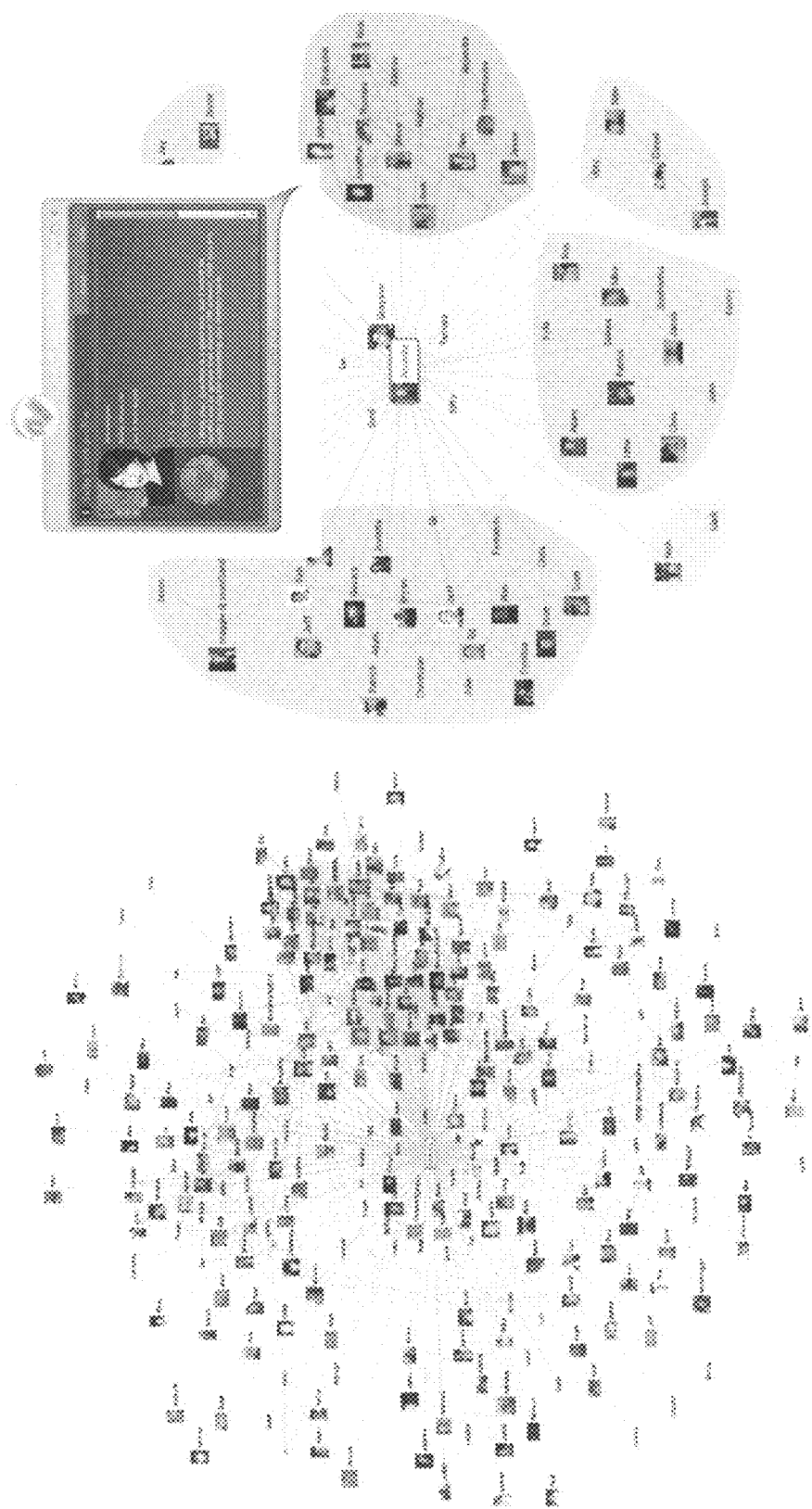
FIG. 14a is a screen shot of an exemplary social network mapping display for a query.
Figure 14B:
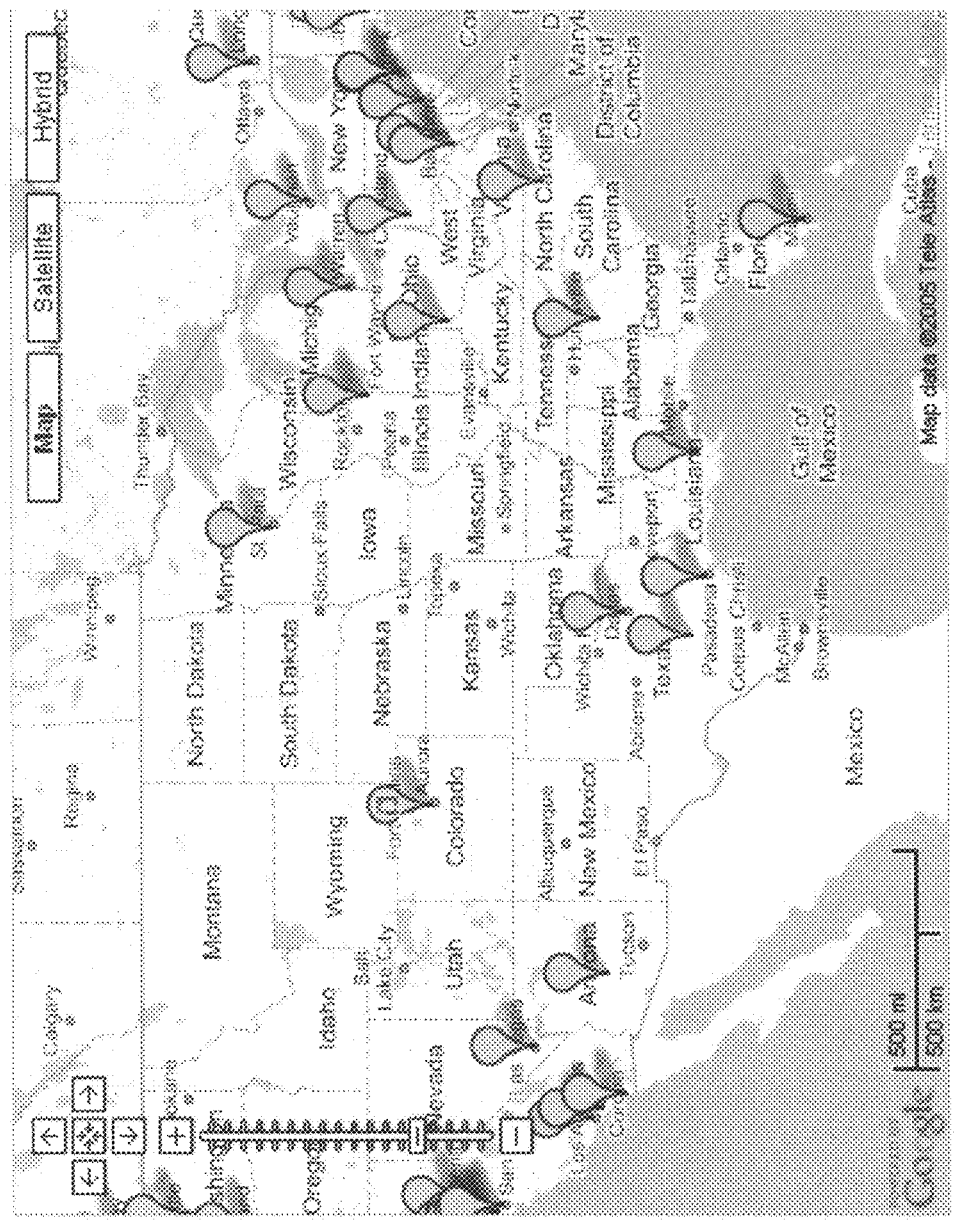
FIG. 14b is a screen shot of an exemplary geo-visualization display for a query.
Figure 14C:
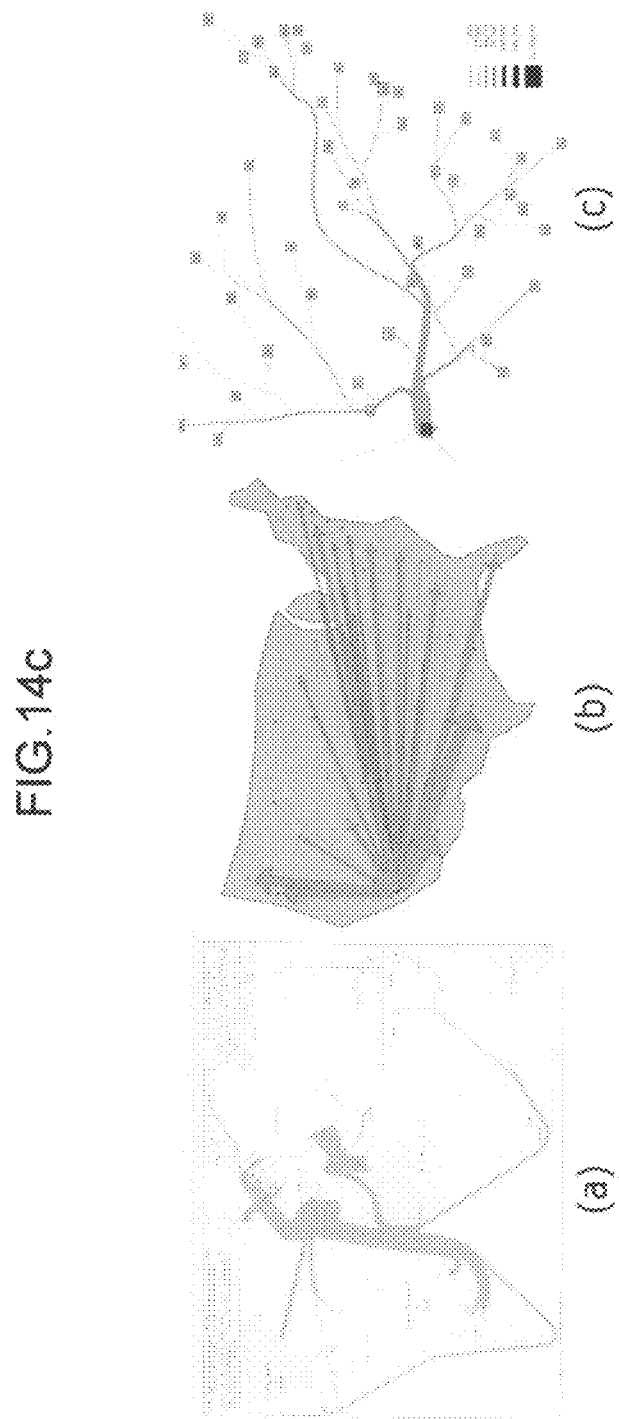
FIG. 14c is a screen shot of an exemplary flow mapping display for a query.

The aggregate of all of the query responses received by the server is the query result. On request from a person with permission to view the result, the server generates visualizations of the query result, in several graphical formats displaying different information. Examples of output in these formats are shown in FIG. 14a-FIG. 14c; they are social network mapping (FIG. 14a), geo-visualization (FIG. 14b), flow mapping (FIG. 14c) and classic charting (not shown). In the geo-visualization format, respondent Internet Protocol (IP) addresses are used to display on a map the location of each respondent. The flow-mapping format shows the geographic movement of queries over time.

All visualization formats include a dual part slider bar which adjusts time and another parameter. Adjusting the time slider allows the user to view the progress of the query, as it is forwarded to additional recipients and as responses accumulate. An example of the other parameter is trust level. When the slider is adjusted to a level corresponding to a certain threshold trust level, responses from any users whose trust level is below the threshold are ignored in updating the query result display.

Figure 15A:
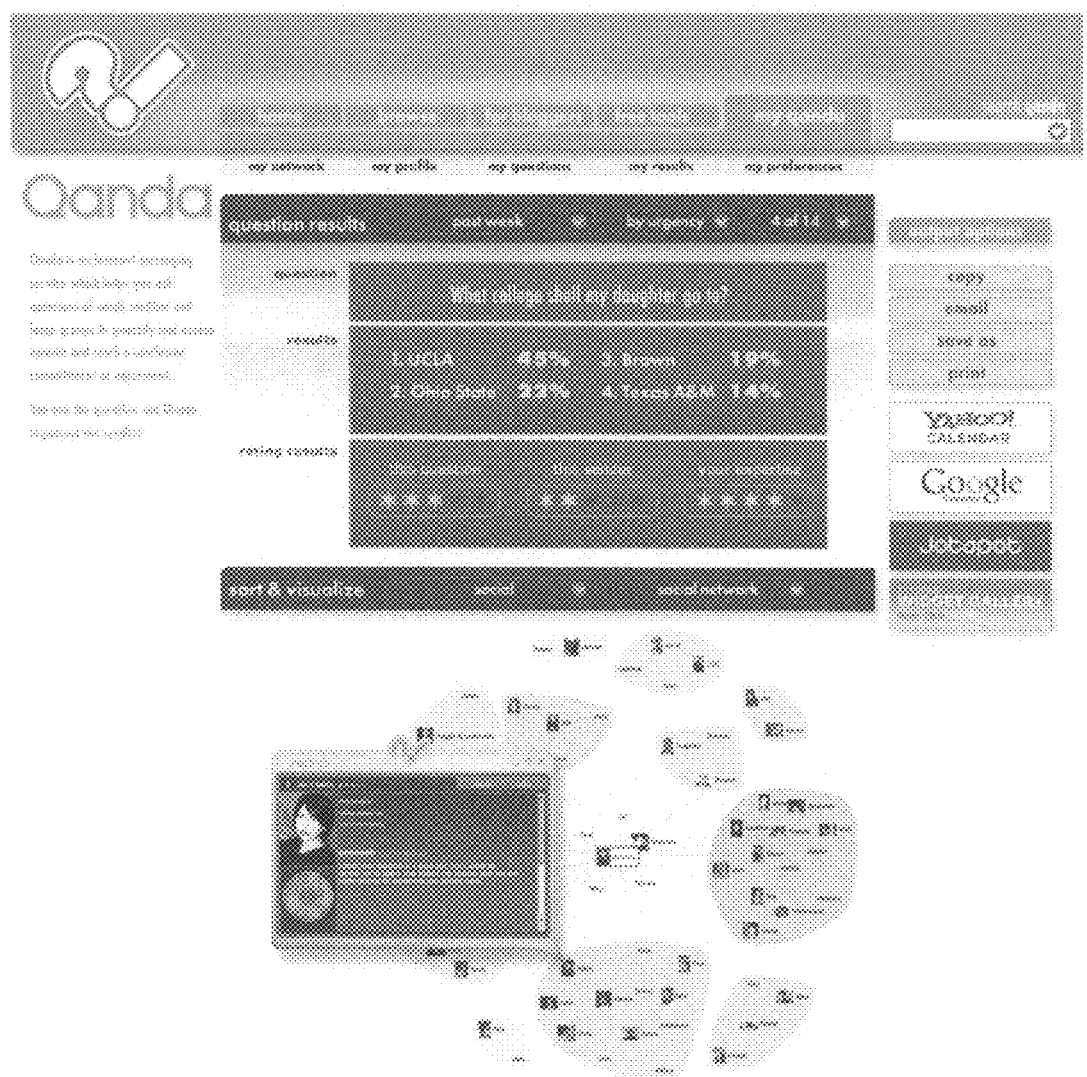
FIG. 15a is a screen shot of an exemplary results page showing local output and export options, the query result in the form of a social network mapping display, and a user profile.
Figure 15B:
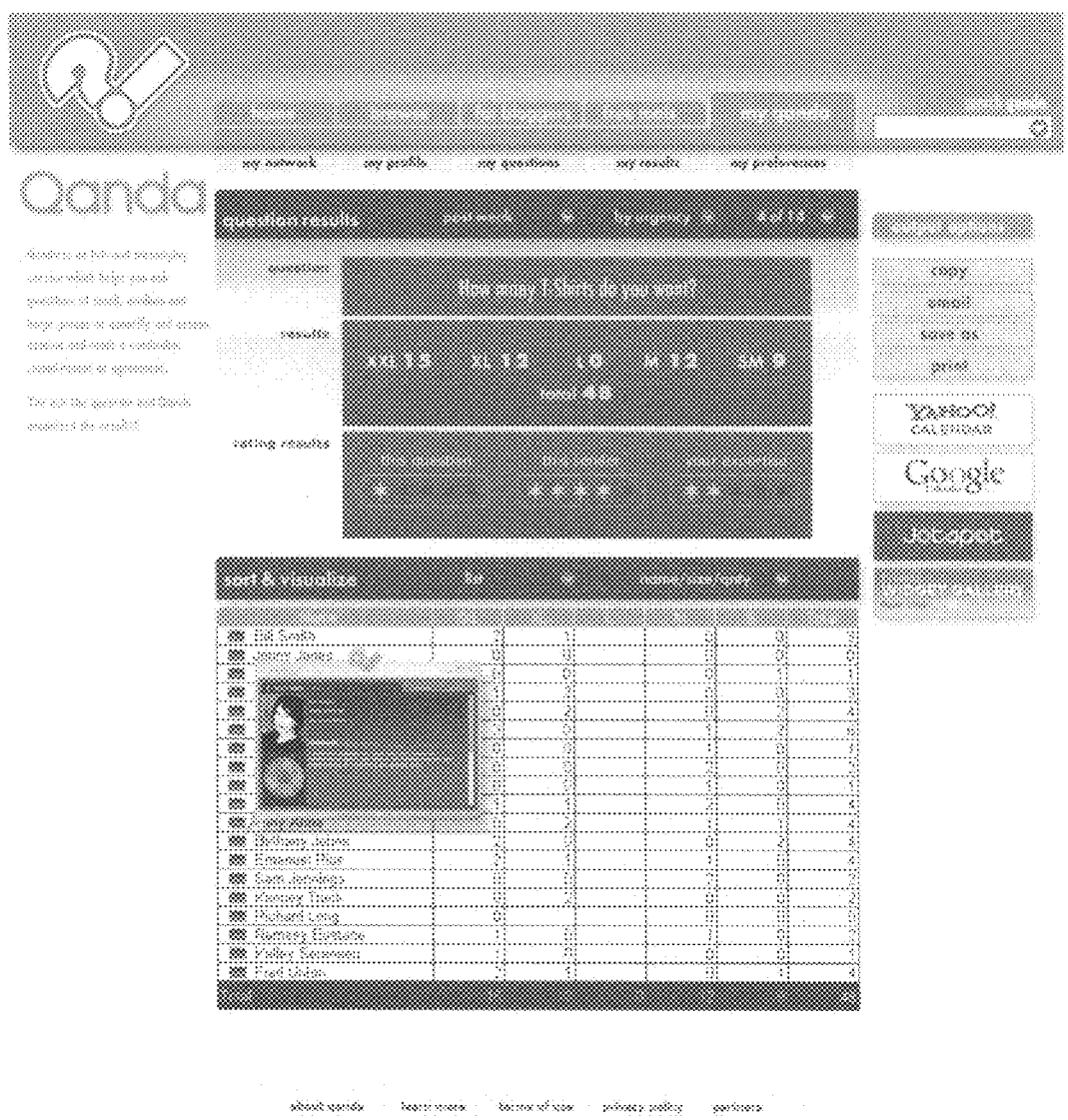
FIG. 15b is a screen shot of an exemplary results page showing local output and export options, the query result in the form of a tabular display, and a user profile.
Figure 15C:
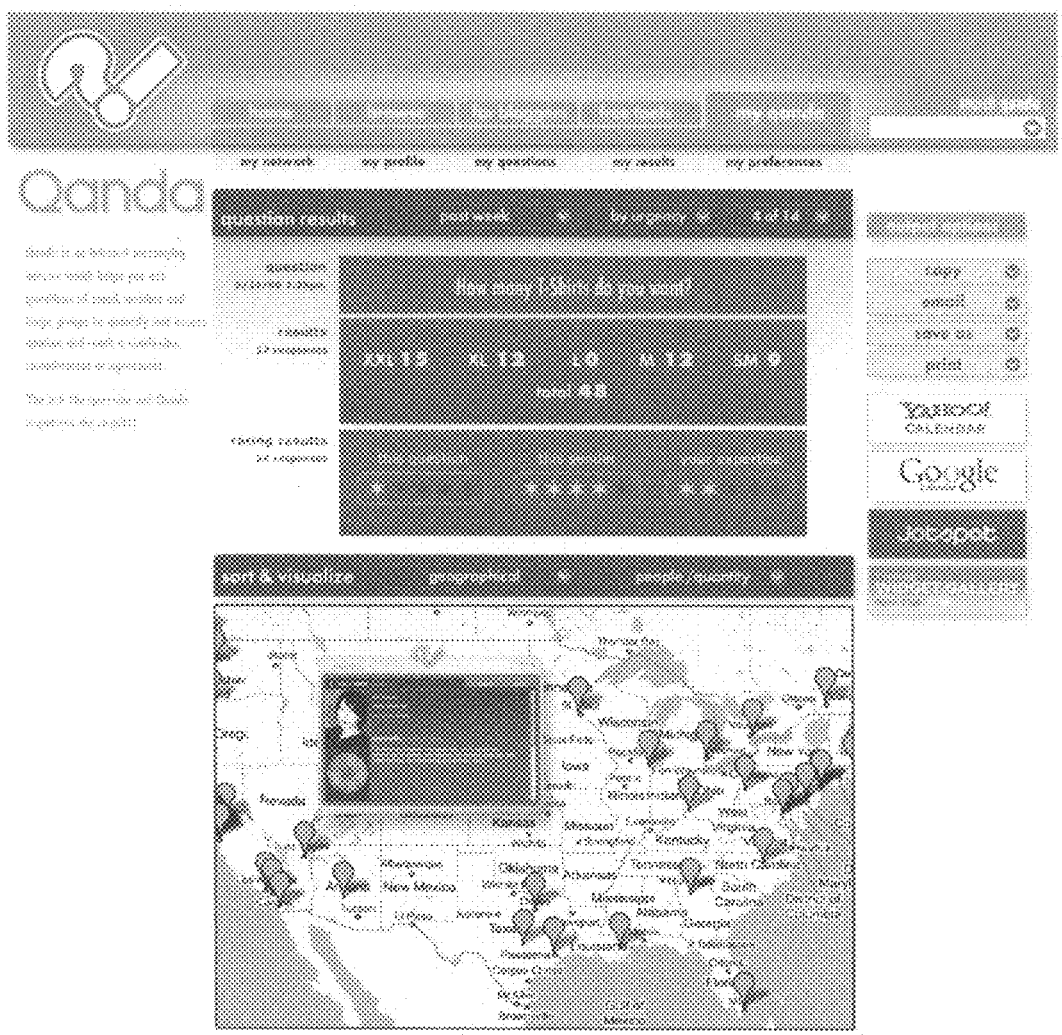
FIG. 15c is a screen shot of an exemplary results page showing local output and export options, the query result in the form of a geo-visualization display, and a user profile.

The query result may also be displayed in a web-page format, as shown in FIG. 15a-FIG. 15c. Query result local output options may be provided for copying the query results to the computer's clipboard, e-mailing them, saving them on the local computer, or printing them. Query result export options may also be provided.

Figure 15D:
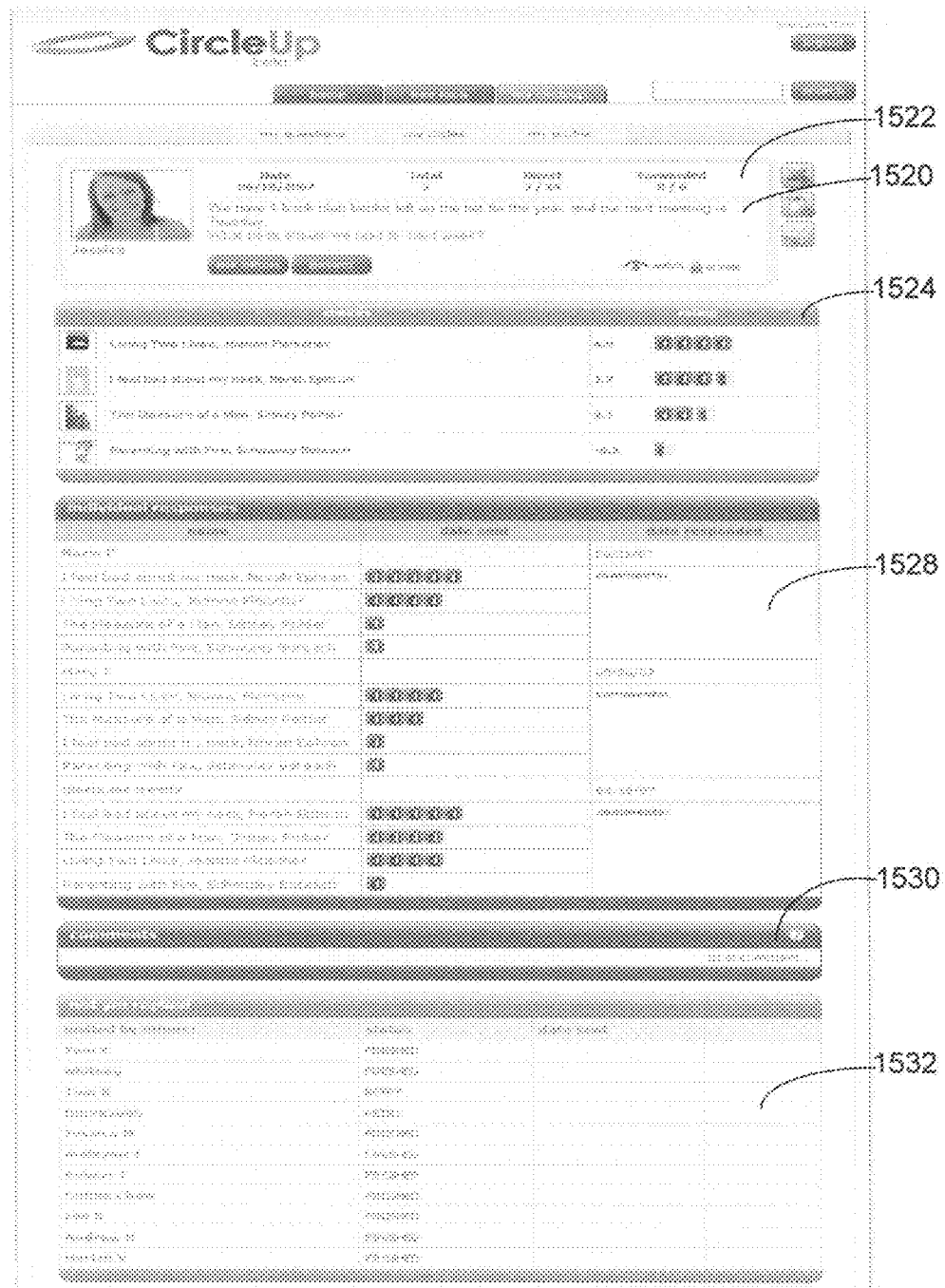
FIG. 15d is a screen shot of another embodiment of an exemplary results page showing the query, response choices, individual responses, and members who have not yet replied.

In an alternate embodiment, shown in FIG. 15d, the GUI illustrates the question 1520, the date the message was sent, the status of responses from correspondents 1522, choices and ratings 1524, individual response data 1528, comments 1530, and a list of correspondents who have not yet replied 1532.

XVI Home Page

Figure 16:
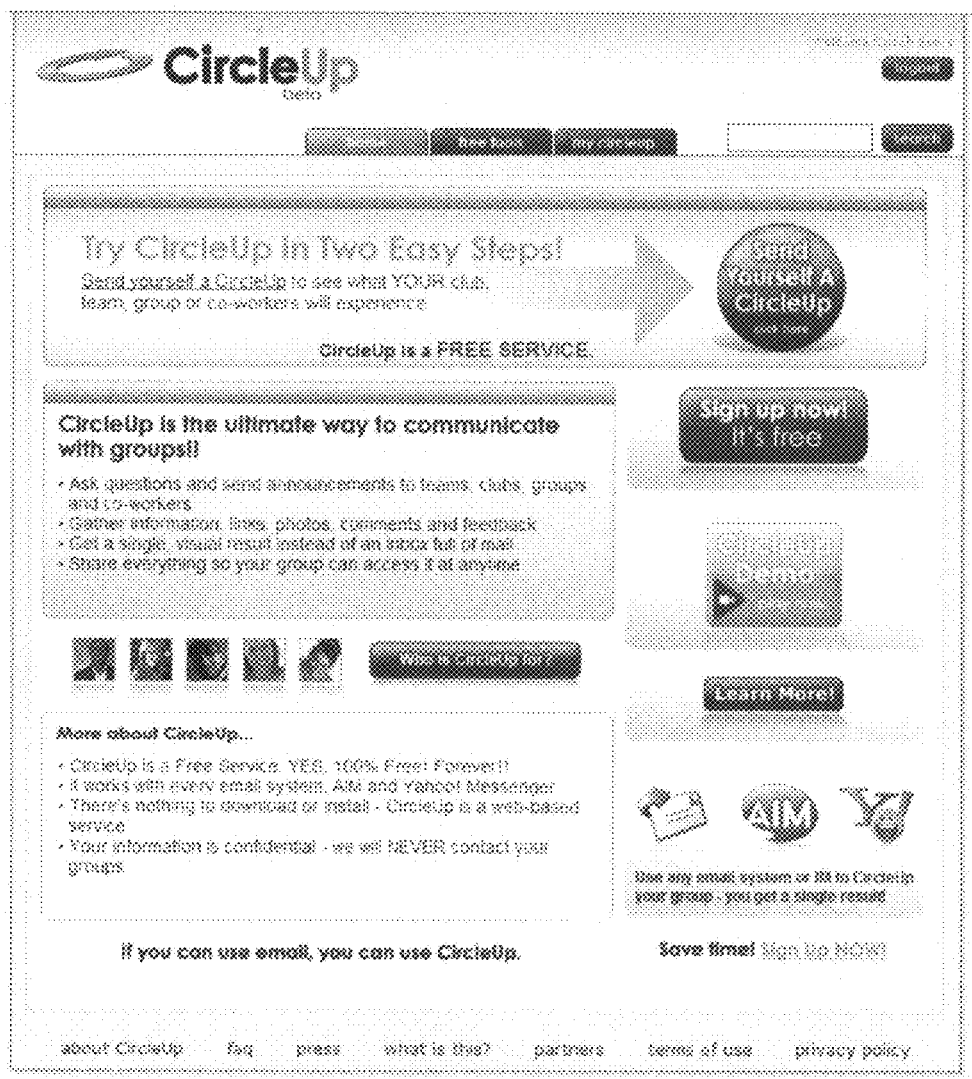
FIG. 16 is a screen shot of an exemplary server home page.

FIG. 16 shows the server home page. It provides a "Join" button used by new users to register with the system, a "Help" button, an opportunity for registered authors to sign in, and the questions from one or more open queries. It also provides an interface for persons who may not be registered users to search or explore past and current public queries and their results.

Figure 17:
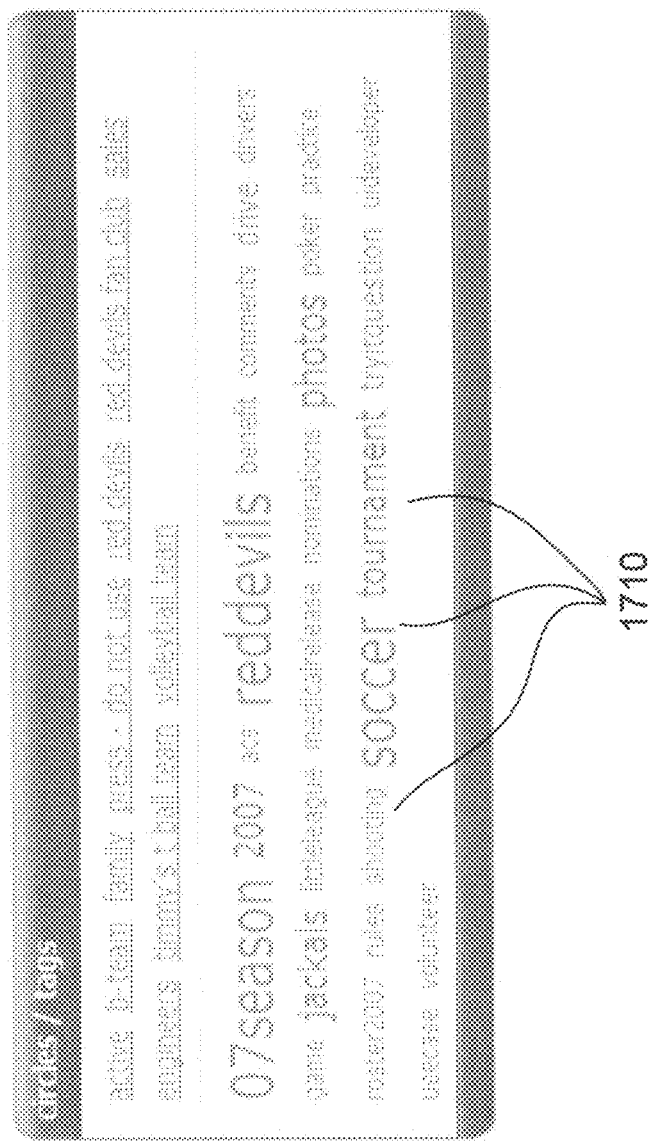
FIG. 17 is a screen shot of an exemplary list of tags.

The server includes a search engine usable by any person visiting the home page to search public queries and their results. Each query may be tagged with a category tag and searches may then be restricted to a specified category or set of categories identified using the tags. Examples of tags 1710 are shown in FIG. 17. Queries may be linked to other queries by their authors.

XVII Intergration Into Other Systems and Software

Figure 18:
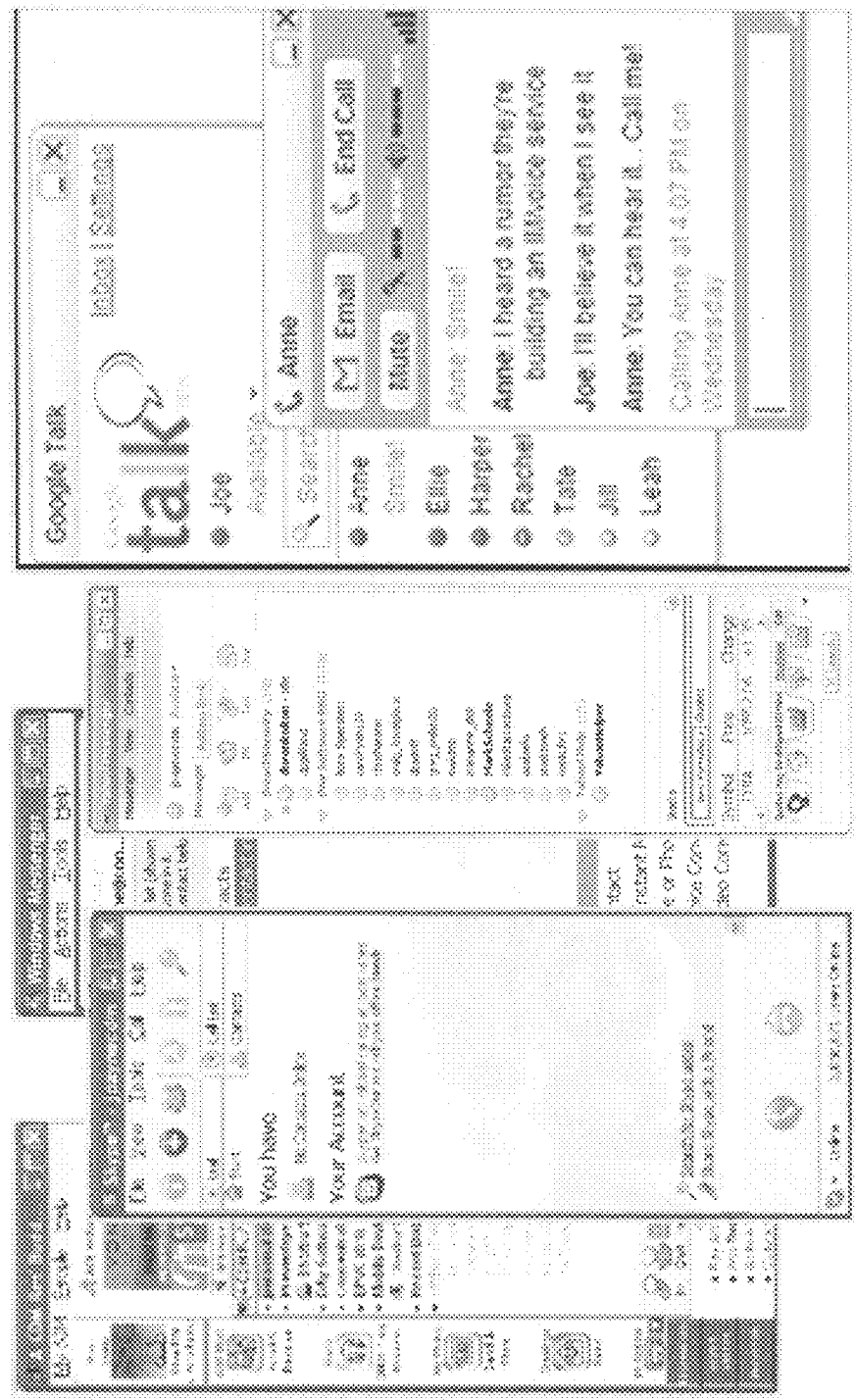
FIG. 18 is a screen shot of an exemplary embedding of GUIs into instant messaging interfaces.

The system is integrated into instant messaging systems to the extent made possible by the instant messaging systems' APIs and licensing policies. The query list GUI, the correspondent management GUI, and a question box allowing the user to generate a new query are embedded into instant messaging clients where possible. Examples of the appearance of such embedding are shown in FIG. 18.

The system may be integrated into the Microsoft® Outlook® e-mail client using plug-ins which automatically create, address, and distribute e-mails for the system. Microsoft® and Outlook® are registered trademarks of Microsoft Corporation, Redmond, Wash. When a query author's means of communication with the server is e-mail, the server generates visualizations of the query result in hypertext markup language (HTML) and delivers them to the author via e-mail.

Figure 19:
FIG. 19 is a screen shot illustrating examples of questions that a user or the system may specify for rapidly retrieval and use.

A user may specify numbered sets of often-used questions and answers using an interface like the one shown in FIG. 19. Once these have been specified, the user is able to send queries using SMS, based on the pre-specified numbered questions, with numbered answer options.

The system may also be integrated with Microsoft Live and Yahoo: the query visualizations of query results, the query list GUI, and the query GUI are all available as Microsoft Live widgets and as Yahoo widgets. Examples of such integration using widgets are shown in FIG. 20.

XVIII Creation of Message Patterns as User Contributed Content

In one embodiment, new messages are documents that are treated as user contributed content by the messaging system. In a typical messaging or polling application, this content is limited to a subset of the pattern data, particularly to item 2. Through the use of an application user interface and or web service, the system allows the user to customize all elements of the message document in a sparse and compact way by re-using previous message documents. These documents are uploaded to the system through the web service and may add new communications possibilities to the messaging system. For example, rather than asking a Yes/No question about Paris using a set of radio buttons, a user may define a new type of message that showed a slide show of tourist attractions in Paris and ask whether the user had seen these places.

The new message may be more effective communication than the previous question and would get a higher approximateValue rating. As a consequence this message may be more likely to be reused, resulting in higher messaging value by affecting message content.

XIX Attribution of Users for Sharing Content for Re-Use

When a user creates a message (perhaps in part through re-using content from previous messages), he or she may enable (or disable) the ability for that message document to be re-used in all or part by other users. The user may also do this subsequently when managing their messages or results. In one embodiment, to motivate a user to share his or her content, in exchange for sharing, the user receives attribution (recognition) and implicitly contributes to the community of users. The user may receive attribution in many ways, including:

1. Ranking of the user on "leader boards" that are subject/domain, or time specific or encompass all content 2. Increased "score" or compensation based on the usage, transactions or advertisements associated with content they have contributed 3. Recognition by nickname, name and/or photo on pages that leverage this re-usable content.

The system's use of attribution to reward contributors of message patterns may beneficially result in behavioral or aesthetic changes in the messaging itself.

XX Approximate Value Ratings

In order to measure messaging effectiveness, in one embodiment, the system may use metrics that correlate with effective messaging. For example, follow up participation, number of complaints, re-use of content, repeat visits by users viewing the content are each examples of metrics that may be correlated (or inversely correlated) to messaging effectiveness. Another metric is explicit ratings of satisfaction. As many users may not want to take the time to rate satisfaction because it requires additional "clicks" or requires sharing an opinion which some users are adverse to, one method for doing this is to make the rating mechanism an implicit part of completing the users process of interacting with the client. For example, in one embodiment, the system provides that:

1. An author clicks a rating to move the message/question of their active list to a list of old or archived messages.

2. A recipient chooses to keep a link to the message/question or to move it to a list of old or processed messages.

In each of the above cases, the system motivates the user to organize or file the message. Instead of clicking "Finished" or "File" or "Archive", the user clicks on a rating button/choice from a group labeled "Archive". The rating buttons may be labeled "Excellent", "Good", "OK", "Useless". The rating allows the system to measure the relative satisfaction of the user and content is not filed without a rating. Beneficially, no additional keystrokes were required for the user to give the rating.

XXI Increased Message Processing Efficiency

In one embodiment, the system recognizes that the value of the message to the author is inversely proportional to the amount of time the recipient has to process the message. If the recipient is very busy, they can't process as many messages or give them as much consideration. A user operates in collaboration with networks of other users (circles) with whom they are in transaction/communication. If a user sends a message to every member of a group of 10 and each user responds to the entire group and each response receives a 40% courtesy or follow up response from the other members of the group including the original group then the total number of messages that is received is: $10+10\times10+4\times10+2\times10+\ldots$ for an approximate total of 170 messages. This is an average of 17 messages per member. If the author sends a query to 10 members of a group and each member responds and the author sends a final result, each then $10+10$ messages are sent for a total of 20 or 2 per member. By reducing the number of messages that have to be exchanged, the system reduces the time required to process the messages by a factor of 8. This results in increased value of the message for all messages that are being processed by the group.

XXII Advertising

Figure 21:
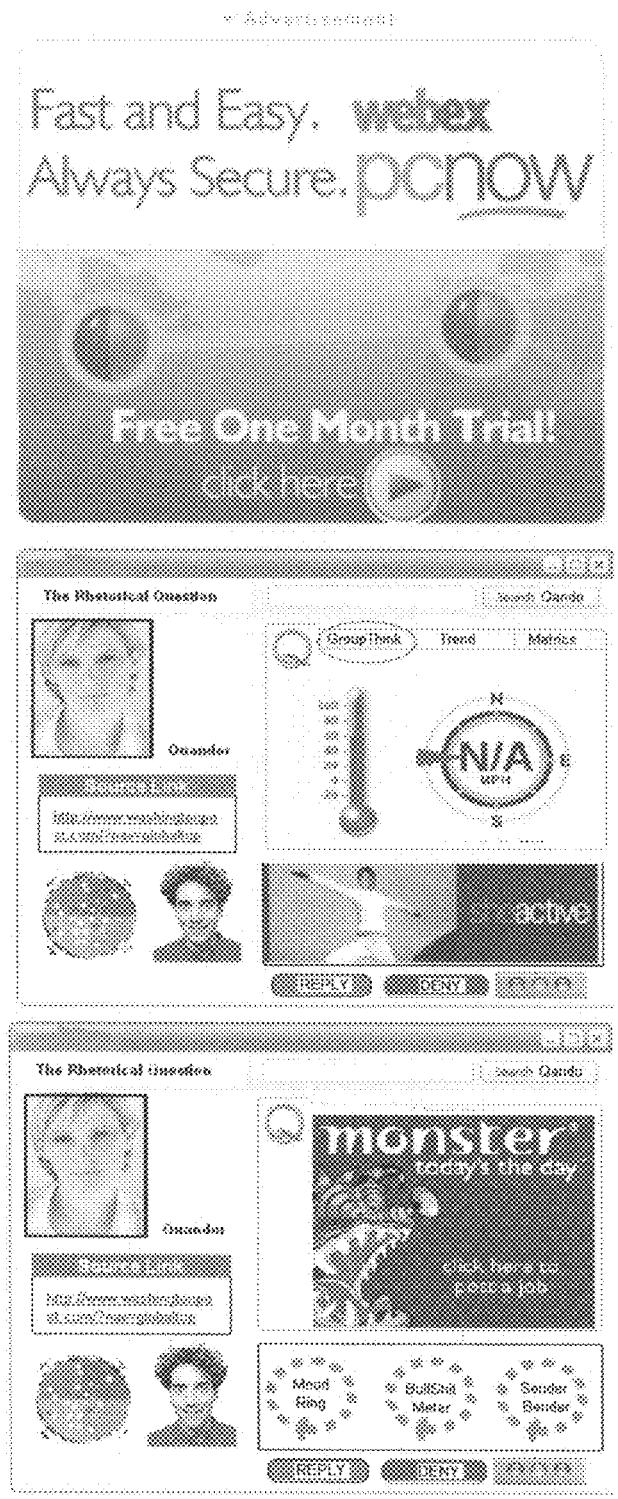
FIG. 21 is a screen shot showing examples of the integration of advertising into various GUIs.

The server inserts advertising, selected according to the underlying content of the query and the responses, into some or all of the GUIs. Examples of advertising insertion are shown in FIG. 21. To select advertising, the underlying content of the query and responses may be analyzed for context, behavioral relations, or geospatial relations. For example, a user typing the question "Should I allow my daughter to go to Paris?" may be presented with airline advertisements showing airfares to Paris, even while the user is in the process of typing the question.

While the present invention has been described in connection with certain exemplary embodiments, it is to be understood that the invention is not limited to the disclosed embodiments, but, on the contrary, is intended to cover various modifications and equivalent arrangements.

What is claimed is:

1. A method for enabling structured communication among a social network including a computer, the method comprising:

receiving, by the computer, input pertaining to a question;

formulating by the computer the question based upon the input;

generating by the computer an answer pattern including potential responses to the question based upon a form of the question;

translating and transmitting by the computer a message including the question and the answer pattern having the potential responses to the question to a plurality of users over a corresponding plurality of preferred messaging platforms from among a plurality of different messaging platforms for eliciting responses to the question from two or more of the users using the answer pattern;

collecting and aggregating by the computer the responses to the question from a corresponding two or more of the plurality of preferred messaging platforms; and presenting by the computer the responses in a summary format, wherein the plurality of preferred messaging platforms comprises, for each user of the plurality of users, a corresponding preferred messaging platform for that user from among the plurality of preferred messaging platforms.

2. The method of claim 1 wherein the formulating step further comprises suggesting the question based upon previously asked questions or a list of generic questions.

3. The method of claim 1 wherein the generating step comprises suggesting one or more answer patterns based upon the question.

4. The method of claim 1 further comprising forming a suggested message that includes the question and answer pattern and one or more elements selected from the list comprising textual and graphical content of the message, presentation of the message while authoring, structure of data and parameters underlying the message, presentation of the message while responding, structure of response data from an individual recipient, aggregation of the response data into results, structure of result data, and presentation of the result data and relationship of the message to sequences of messages.

5. The method of claim 4, further comprising creating a further question by specifying, referencing or extending one or more elements of a prior message created by a same or different author.

6. The method of claim 4, further comprising specifying how new messages are derived from data from a previous message or response in a sequence.

7. The method of claim 6, further comprising defining a range of possible derived messages from a given message.

8. The method of claim 6, further comprising specifying timing and workflow for performing the translating and transmitting.

9. The method of claim 4, further comprising containing the elements in either a single document or a network of referenced documents.

10. The method of claim 4 wherein the formulating step comprises formulating a question based upon changes or extensions to a previous question.

11. The method of claim 1 wherein the formulating step comprises recommending content based on one or more of user preferences, past use, or current context.

12. The method of claim 1 wherein the message includes audio and/or video components.

13. The method of claim 1, further comprising receiving a response from an unregistered user.

14. The method of claim 1, further comprising crediting a response to an unregistered user.

15. The method of claim 1, further comprising:
enabling a user to assign a level of trust for each of one or more users; and
transmitting the question to a subset of the one or more users based on the level of trust for each of the one or more users.

16. The method of claim 15, further comprising assigning the level of trust for a particular correspondent among the one or more users by inferring the level of trust based on levels of trust other users have assigned to that correspondent.

17. The method of claim 1, further comprising enabling a user to specify the plurality of users without specifying individual addresses of the users.

18. The method of claim 17 wherein the transmitting step comprises selecting a send address for each of the users based on sender, recipient, group preferences, and available addresses and messaging channels.

19. The method of claim 17, further comprising enabling a user to assign an access level to one or more users and restricting access to groups of the one or more users based upon the access level.

20. The method of claim 17, further comprising enabling a user to share users and groups without sharing addressing information.

21. The method of claim 1 wherein the transmitting step comprises sending messages across different messaging channels, including one or more channels for which at least one of the users does not have direct access.

22. The method of claim 1 further comprising:
submitting a question and answer pattern as part of a body of user contributed content; and
referencing and extending the content to formulate new question and answer patterns.

23. The method of claim 1 wherein the aggregating step comprises aggregating responses from users in a group without disseminating all responses to all participants.

24. The method of claim 1, further comprising recommending content and patterns and elements of patterns for re-use based upon a measured effectiveness of the message.

25. The method of claim 1, further comprising crediting authors for their contribution to a message content or pattern based upon a measured effectiveness of the message.

26. The method of claim 1 wherein the formulating step comprises suggesting a question based upon the input from a user.

27. The method of claim 26 wherein the formulating step comprises suggesting a question based at least in part upon prior questions asked by users other than the user who provided the input.

28. The method of claim 26 wherein the generating step further comprises generating an answer pattern including potential responses at least in part from questions asked by users other than the user who provided the input.

29. The method of claim 1 wherein the translating and transmitting step comprises translating a message into a format that depends upon a messaging network over which the message is transmitted.

30. The method of claim 1, further comprising presenting a user with a designation of groups of correspondents in the form of a circle on a graphical user interface.

31. The method of claim 1, further comprising suggesting one or more follow up questions based upon a response to a prior question.

32. The method of claim 1, further comprising enabling a user to specify whether the question may be relayed by a recipient to other users.

33. The method of claim 1, further comprising resending a user the question on a messaging network different from the one over which the question was first sent.

34. The method of claim 1, further comprising presenting marketing material on a graphical user interface selected according to a content of the question or answers.

35. A system for enabling structured communication among a social network, the system comprising:
a computer;
a nonvolatile storage device; and
computer instructions stored on the storage device and configured to run on the computer and implement:
a question writing module for formulating a question;
a question management system coupled to a database stored on the storage device and adapted for generating an answer pattern including potential responses to the question based upon a form of the question;

a messaging hub adapted for translating and transmitting the question and the answer pattern including the potential responses to the question to a plurality of users over a corresponding plurality of preferred messaging platforms from among a plurality of different messaging platforms for eliciting responses to the question from two or more of the users using the answer pattern; and widgets and/or plugins adapted to communicate with one or more different platforms, software applications, browsers or other environments, wherein the messaging hub and question management system are further adapted for collecting and aggregating the responses to the question from a corresponding two or more of the plurality of preferred messaging platforms and presenting the responses in a summary format, wherein the plurality of preferred messaging platforms comprises, for each user of the plurality of users, a corresponding preferred messaging platform for that user from among the plurality of preferred messaging platforms.

36. The system of claim 35 wherein the question writing module is configured to suggest the question based upon previously asked questions or a list of generic questions.

37. The system of claim 35 wherein the question management system is configured to suggest one or more answer patterns based upon a content of the question.

38. The system of claim 35 wherein the question management system enables a user to provide a message that includes the question and answer pattern and one or more elements selected from the list comprising textual and graphical content of the message, presentation of the message while authoring, structure of data and parameters underlying the message, presentation of the message while responding, structure of response data from an individual recipient, aggregation of the response data into results, structure of result data, and presentation of the result data and relationship of the message to sequences of messages.

39. The system of claim 35 wherein the widgets and/or plugins are adapted to receive a response from an unregistered user.

40. The system of claim 35 wherein the messaging hub is further adapted to send messages across different messaging channels, including one or more channels for which at least one of the users does not have direct access.

* * * * *